US012608793B2

(12) United States Patent
Abbey et al.

(10) Patent No.: US 12,608,793 B2
(45) Date of Patent: Apr. 21, 2026

(54) METHOD OF IDENTIFYING A STRUCTURE

(71) Applicant: LA TROBE UNIVERSITY, Melbourne (AU)

(72) Inventors: Brian Abbey, Melbourne (AU); Eugeniu Balaur, Melbourne (AU); Belinda Parker, Melbourne (AU)

(73) Assignee: La Trobe University, Melbourne (AU)

( * ) Notice: Subject to any disclaimer, the term of this patent is extended or adjusted under 35 U.S.C. 154(b) by 724 days.

(21) Appl. No.: 17/297,979

(22) PCT Filed: Nov. 29, 2019

(86) PCT No.: PCT/IB2019/060309
§ 371 (c)(1),
(2) Date: May 27, 2021

(87) PCT Pub. No.: WO2020/110071
PCT Pub. Date: Jun. 4, 2020

(65) Prior Publication Data
US 2022/0215533 A1 Jul. 7, 2022

(30) Foreign Application Priority Data

Nov. 29, 2018 (AU) ................................ 2018904550

(51) Int. Cl.
*G06T 7/00* (2017.01)
*G02B 5/00* (2006.01)
(Continued)

(52) U.S. Cl.
CPC ............ *G06T 7/0012* (2013.01); *G02B 5/008* (2013.01); *G02B 21/365* (2013.01);
(Continued)

(58) Field of Classification Search
CPC ..................... G06T 7/00; G06T 7/0012; G06T 2207/10056; G06T 2207/30024;
(Continued)

(56) References Cited

U.S. PATENT DOCUMENTS 5,836,872 A     11/1998   Kenet et al.
6,404,916 B1 *  6/2002    De La Torre-Bueno ....................
                                                    G06V 20/69
                                                    382/167
(Continued)

FOREIGN PATENT DOCUMENTS

CN          1582394 A      2/2005
CN          1957245 A      5/2007
(Continued)

OTHER PUBLICATIONS

U.S. Appl. No. 17/297,974, filed May 27, 2021, Abbey et al.
(Continued)

*Primary Examiner* — Stephen R Koziol
*Assistant Examiner* — Benedict E Lee
(74) *Attorney, Agent, or Firm* — Knobbe, Martens, Olson & Bear, LLP

(57) ABSTRACT

A method includes providing a sample holder having a plasmonic layer and applying the sample to the sample holder. The sample is illuminated and an image formed. The method enables identifying a structure in the sample from the image based at least partly on its colour. The colour can encode a structural property of the sample, preferably without staining. The method can be used to differentiate a state of at least one cell in a sample. Application to identification of cancer and non-cancer abnormalities are disclosed.

22 Claims, 17 Drawing Sheets

(51) Int. Cl.

| | |
|---|---|
| *G02B 21/36* | (2006.01) |
| *G06V 10/44* | (2022.01) |
| *G06V 10/50* | (2022.01) |
| *G06V 10/56* | (2022.01) |
| *G06V 20/69* | (2022.01) |

(52) U.S. Cl.

CPC .......... *G06V 10/443* (2022.01); *G06V 10/507* (2022.01); *G06V 10/56* (2022.01); *G06V 20/693* (2022.01); *G06V 20/695* (2022.01); *G06V 20/698* (2022.01); *G06T 2207/10056* (2013.01); *G06T 2207/30024* (2013.01)

(58) Field of Classification Search

CPC ........ G02B 5/00; G02B 5/008; G02B 21/365; G02B 21/06; G02B 21/34; G02B 21/0052; G02B 21/26; G02B 21/36; G02B 21/361; G02B 21/362; G02B 21/364; G06V 10/44; G06V 10/443; G06V 10/507; G06V 10/56; G06V 20/69; G06V 20/693; G06V 20/695; G06V 20/698; B82Y 35/00; B82Y 20/00; G01N 21/552; G01N 21/554; G01N 21/17; G01N 21/25; G01N 21/29; G01N 21/31; G01N 21/293; G01N 2021/1776; G01N 2021/258

See application file for complete search history.

(56) References Cited

U.S. PATENT DOCUMENTS

| | | | |
|---|---|---|---|
| 6,650,357 | B1 | 11/2003 | Richardson |
| 8,154,722 | B2 | 4/2012 | Yamada et al. |
| 8,536,545 | B2 | 9/2013 | Wu et al. |
| 8,687,180 | B2 * | 4/2014 | Cohen ................ G01M 11/0228 356/124 |
| 9,304,234 | B2 | 4/2016 | Liu et al. |
| 9,464,985 | B2 * | 10/2016 | Liu ...................... G01N 21/554 |
| 9,482,784 | B2 | 11/2016 | Yen et al. |
| 9,675,288 | B2 | 6/2017 | Yamakawa et al. |
| 9,744,793 | B2 | 8/2017 | Petiton et al. |
| 9,835,870 | B2 * | 12/2017 | Astratov ............... G02B 5/008 |
| 10,185,137 | B2 * | 1/2019 | Dai ........................ H04N 23/56 |
| 10,768,105 | B1 * | 9/2020 | Mohan ................ G02B 21/084 |
| 11,150,038 | B1 | 10/2021 | Poole et al. |
| 11,506,881 | B2 | 11/2022 | Balaur et al. |
| 11,545,237 | B2 * | 1/2023 | Meyer ................... G16B 40/20 |
| 11,774,361 | B2 * | 10/2023 | Fereidouni .............. G01N 1/30 435/40.5 |
| 11,798,300 | B2 * | 10/2023 | Cotte .................. G06V 20/698 |
| 2002/0115224 | A1 | 8/2002 | Rudel et al. |
| 2003/0096302 | A1 | 5/2003 | Yguerabide et al. |
| 2005/0136549 | A1 | 6/2005 | Gholap et al. |
| 2007/0153267 | A1 | 7/2007 | Wang et al. |
| 2007/0178607 | A1 | 8/2007 | Prober et al. |
| 2008/0099667 | A1 | 5/2008 | Stark et al. |
| 2008/0252894 | A1 | 10/2008 | Lakowicz et al. |
| 2008/0252984 | A1 | 10/2008 | Lee et al. |
| 2008/0274905 | A1 | 11/2008 | Greene |
| 2009/0060303 | A1 | 3/2009 | Douglass et al. |
| 2009/0153866 | A1 | 6/2009 | Yamamichi et al. |
| 2010/0062422 | A1 | 3/2010 | Ausserre |
| 2010/0142259 | A1 | 6/2010 | Drindic et al. |
| 2010/0254589 | A1 | 10/2010 | Gallagher |
| 2010/0264032 | A1 | 10/2010 | Bazant |
| 2010/0290692 | A1 | 11/2010 | Macaulay et al. |
| 2010/0291575 | A1 | 11/2010 | Shamah et al. |
| 2011/0157593 | A1 | 6/2011 | Miyadera et al. |
| 2012/0113424 | A1 | 5/2012 | Suda et al. |
| 2013/0065777 | A1 * | 3/2013 | Altug ............... G01N 33/54346 506/16 |
| 2013/0279789 | A1 | 10/2013 | Elter et al. |
| 2014/0131559 | A1 | 5/2014 | Yen et al. |
| 2014/0168651 | A1 | 6/2014 | Guo |
| 2014/0206101 | A1 | 7/2014 | Liu et al. |
| 2014/0327913 | A1 | 11/2014 | Pacifici et al. |
| 2014/0349278 | A1 | 11/2014 | Yamamoto |
| 2015/0002843 | A1 | 1/2015 | Yokogawa |
| 2015/0177140 | A1 | 6/2015 | Guo |
| 2016/0108256 | A1 | 4/2016 | Yang et al. |
| 2016/0110584 | A1 | 4/2016 | Remiszewski et al. |
| 2016/0258114 | A1 | 9/2016 | Firth et al. |
| 2016/0290926 | A1 | 10/2016 | Notingher et al. |
| 2016/0306157 | A1 | 10/2016 | Rho et al. |
| 2016/0334398 | A1 | 11/2016 | Weissleder et al. |
| 2016/0355869 | A1 | 12/2016 | Blair et al. |
| 2016/0357026 | A1 | 12/2016 | Astratov et al. |
| 2016/0370290 | A1 | 12/2016 | Raphael et al. |
| 2018/0045644 | A1 | 2/2018 | Baumgold |
| 2018/0066937 | A1 | 3/2018 | Ikeda et al. |
| 2018/0107038 | A1 | 4/2018 | Chen et al. |
| 2018/0202918 | A1 * | 7/2018 | Tanaka ................... G01N 21/01 |
| 2019/0071779 | A1 | 3/2019 | Hamers et al. |
| 2019/0154652 | A1 | 5/2019 | Ghosh et al. |
| 2019/0195809 | A1 | 6/2019 | Agarwal et al. |
| 2019/0317011 | A1 | 10/2019 | Hu |
| 2020/0116987 | A1 * | 4/2020 | Kleppe .............. G02B 21/0064 |
| 2020/0142173 | A1 | 5/2020 | Balaur et al. |
| 2020/0264043 | A1 | 8/2020 | Allen |
| 2020/0285043 | A1 | 9/2020 | Nyga et al. |
| 2020/0319382 | A1 | 10/2020 | Guo et al. |
| 2020/0326282 | A1 | 10/2020 | Singamaneni et al. |
| 2021/0181391 | A1 * | 6/2021 | Subramaniyam .... G01N 21/774 |
| 2022/0059866 | A1 | 2/2022 | Mukherjee et al. |
| 2022/0091307 | A1 | 3/2022 | Abbey et al. |
| 2022/0091407 | A1 * | 3/2022 | Abbey ................... G02B 21/06 |
| 2022/0092824 | A1 | 3/2022 | Abbey et al. |
| 2022/0215533 | A1 | 7/2022 | Abbey et al. |
| 2022/0235415 | A1 | 7/2022 | Fretes |
| 2022/0381984 | A1 | 12/2022 | Li et al. |
| 2023/0266291 | A1 | 8/2023 | Myrick |

FOREIGN PATENT DOCUMENTS

| | | | |
|---|---|---|---|
| CN | 101031789 A | 9/2007 | |
| CN | 1847829 B * | 8/2010 | ............. G02B 21/34 |
| CN | 101470219 | 9/2010 | |
| CN | 102317781 A * | 1/2012 | ............. C40B 30/04 |
| CN | 102460171 A * | 5/2012 | ......... G01N 33/5064 |
| CN | 103018167 A * | 4/2013 | |
| CN | 101952697 | 8/2014 | |
| CN | 104919299 A | 9/2015 | |
| CN | 105974571 A | 9/2016 | |
| CN | 205691505 U | 11/2016 | |
| CN | 107024474 A * | 8/2017 | ......... G01N 21/8483 |
| CN | 108474874 A | 8/2018 | |
| DE | 10329195 A1 | 1/2005 | |
| DE | 102012214932 | 2/2014 | |
| EP | 2 653 903 | 10/2013 | |
| EP | 3 121 587 | 1/2017 | |
| EP | 2146229 | 4/2019 | |
| JP | 2001133618 | 5/2001 | |
| JP | 2007-501391 | 1/2007 | |
| JP | 2007192806 | 8/2007 | |
| JP | 2007-538264 | 12/2007 | |
| JP | 2009-222401 | 10/2009 | |
| JP | 2009223123 | 10/2009 | |
| JP | 2010009025 | 1/2010 | |
| JP | 2011-53151 | 3/2011 | |
| JP | 2011-252928 | 12/2011 | |
| JP | 2012-159792 | 8/2012 | |
| JP | 2013-142546 | 7/2013 | |
| JP | 2013-231682 | 11/2013 | |
| JP | 2015-12128 | 1/2015 | |
| JP | 2016-212126 | 12/2016 | |
| JP | 2015-514225 | 3/2018 | |
| JP | 2018-528405 | 9/2018 | |
| JP | 2018-532132 | 11/2018 | |
| KR | 20120075189 | 12/2012 | |
| TW | 201418698 | 5/2014 | |
| WO | WO 2003/073817 | 9/2003 | |
| WO | WO 2005/017570 | 2/2005 | |

(56) References Cited

FOREIGN PATENT DOCUMENTS

| | | | | |
|---|---|---|---|---|
| WO | WO 2005/114298 | 12/2005 | | |
| WO | WO 2008/039212 | 4/2008 | | |
| WO | WO-2009023635 A1 * | 2/2009 | ........... | G02B 26/105 |
| WO | WO 2009/072098 | 6/2009 | | |
| WO | WO 2009/089292 | 7/2009 | | |
| WO | WO 2010/075033 | 7/2010 | | |
| WO | WO 2010/132890 | 11/2010 | | |
| WO | WO 2011/163624 | 12/2011 | | |
| WO | WO 2013/089996 | 6/2013 | | |
| WO | WO 2014/053955 | 4/2014 | | |
| WO | WO 2015005904 | 1/2015 | | |
| WO | WO 2015/056584 | 4/2015 | | |
| WO | WO 2015/140362 | 9/2015 | | |
| WO | WO 2015/199976 | 12/2015 | | |
| WO | WO 2017/051195 | 3/2017 | | |
| WO | WO 2017/109175 | 6/2017 | | |
| WO | WO 2017/135430 | 8/2017 | | |
| WO | WO 2017/161097 | 9/2017 | | |
| WO | WO 2018/107038 | 6/2018 | | |
| WO | WO 2018/152157 | 8/2018 | | |
| WO | WO 2018/213881 | 11/2018 | | |
| WO | WO 2020/110069 | 6/2020 | | |
| WO | WO 2020/110070 | 6/2020 | | |
| WO | WO 2020/110071 | 6/2020 | | |
| WO | WO 2020/110072 | 6/2020 | | |

OTHER PUBLICATIONS

U.S. Appl. No. 17/297,977, filed May 27, 2021, Abbey et al.

U.S. Appl. No. 17/297,980, filed May 27, 2021, Abbey et al.

Altunbay, D. et al. Color Graphs for Automated Cancer Diagnosis and Grading, Mar. 2010.

Arora, P. and Krishnan, A. "Fourier plane colorimetric sensing using broadband imaging of surface plasmons and application to biosensing," Dec. 16, 2015.

Huang, Fu Min et al. "Nanohole Array as a Lens," Jun. 2008.

Huang, Fu Min et al. "Focusing of Light by a Nano-Hole Array," Dec. 2006.

Jiang, Jing et al. "Plasmonic Nano-arrays for Ultrasensitive Bio-Sensing," published Aug. 28, 2018.

Schmid, P. "Segmentation of Digitized Dermatoscopic Images by Two-Dimensional Color Clustering," Feb. 1999.

Wisaeng, K and Sa-Ngiamvibool, W. "Improved fuzzy c-means clustering in the process of exudates detection using mathematical morphology," Mar. 7, 2017.

Wu, Li and Qu Xiaogang "Cancer Biomarker Detection: Recent Achievements and Challenges," Mar. 5, 2015.

Motevich I. G. et al: "Application of Plasmonic Silver Films in Histology for Contrast Enhancement", Journal of Applied Spectroscopy, vol. 79, No. 4, Sep. 2012 (Sep. 2012), pp. 632-636.

Wang X et al: "Self-Referenced Smartphone-Based Nanoplasmonic Imaging Platform for Colorimetric Biochemical Sensing", Analytical Chemistry, vol. 89, No. 1, Dec. 15, 2016 (Dec. 15, 2016), pp. 611-615.

Extended European Search Report for EP Application No. 19889220.0, dated Nov. 10, 2022.

Notice of Reasons for Rejection in JP Patent Application No. 2021-230110 (English translation), dated Apr. 11, 2023 in 6 pages.

Office Action for CN Application No. 201980090294.2 dated Feb. 2, 2023 and Search Report in 9 pages (no English translation available).

Notice of Reasons for Rejection in JP Patent Application No. 2021-530111, dated May 30, 2023 and English Translation, in 13 pages.

Lee Seung-Woo et al: "Highly Sensitive Biosensing Using Arrays of Plasmonic Au Nanodisks Realized by Nanoimprint Lithography", ACS Nano, vol. 5, No. 2, Jan. 11, 2011 (Jan. 11, 2011), pp. 897-904, XP055943779, US, ISSN: 1936-0851, DOI: 10.1021/nn10204lm.

Mudachathi Renilkumar et al: "Design of a 1-7 colorimetric sensing platform using reflection mode plasmonic colour filters", Proceedings of SPIE; [vol. 10524], SPIE, US, vol. 10346, Aug. 25, 2017 (Aug. 25, 2017), pp. 103460D-103460D, XP060092566.

Balaur Eugenio et al: "Electron-beam induced diamond-like-carbon passivation of plasmonic devices", Biomedical Photonics and Optoelectronic Imaging : Nov. 8-10, 2000, Beijing, China; Spie, Bellingham, Wash., US, vol. 9668, Dec. 22, 2015 (Dec. 22, 2015), pp. 966817-966817.

Langley et al: Dual pitch plasmonic devices for polarization enhanced colour based sensing;, Proceedings of SPIE; [vol. 10524], SPIE, US, vol. 10013, Dec. 9, 2016 (Dec. 9, 2016).

Kan et al: Sub-micron aperture plate for intracellular calcium transient measurement;, Transducers '05 : Seoul, Korea, [Jun. 5-9, 2005] ; Digest of Technical Papers, IEEE Operations Center, Piscataway, NJ, vol. 2, Jun. 5, 2005 (Jun. 5, 2005).

Shan Mingguang et al: "Refractive index variance of cells and tissues measured by quantitative phase imaging", Optics Express, [Online] vol. 25, No. 2, Jan. 23, 2017 (Jan. 23, 2017), p. 1573, XP055918186, ISSN: 1094-4087, DOI: 10.1364/OE.25.001573 Retrieved from the Internet: URL: https://www.osapublishing.org/viewmedia.cfm?URI=oe-25-2-1573> retrieved on Jul. 4, 2022].

European Supplementary Search Report for EP Application No. 19890517.6 dated Aug. 3, 2022 in 14 pages.

European Extended Search Report for EP Application No. 19889218.4 dated Aug. 9, 2022 in 10 pages.

European Search Report for EP Application No. 19889220.0 dated Aug. 12, 2022 in 14 pages.

European Search Report for EP Application No. 19890518.4 dated Aug. 4, 2022 in 9 pages.

Carr, R.J.G., et al. "Submicron optical sources for single macromolecule detection," Proceedings of the SPIE, SPIE, Bellingham, VA, US, vol. 1796, Sep. 8, 1992, pp. 152-156.

Balaur, E., et al. "Continuously tunable, polarization controlled, colour palette produced from nanoscale plasmonic pixels." Scientific reports 6 (2016): 28062.

Office Action dated Aug. 22, 2023 for Chinese Patent Application No. 201980090294.2.

Office Action for Japanese Patent Application No. 2021-530110.

Office Action dated Sep. 14, 2023 for Canadian Patent Application No. 3,121,434.

Office Action dated Sep. 14, 2023 for Canadian Patent Application No. 3,121,425.

Office Action dated May 3, 2024 for India patent application No. 202127023681.

Office Action and Search Report dated Nov. 20, 2023 for China patent application No. 201980090311.2.

Office Action and Search Report dated Jan. 3, 2024 for China patent application No. 201980090290.4.

* cited by examiner

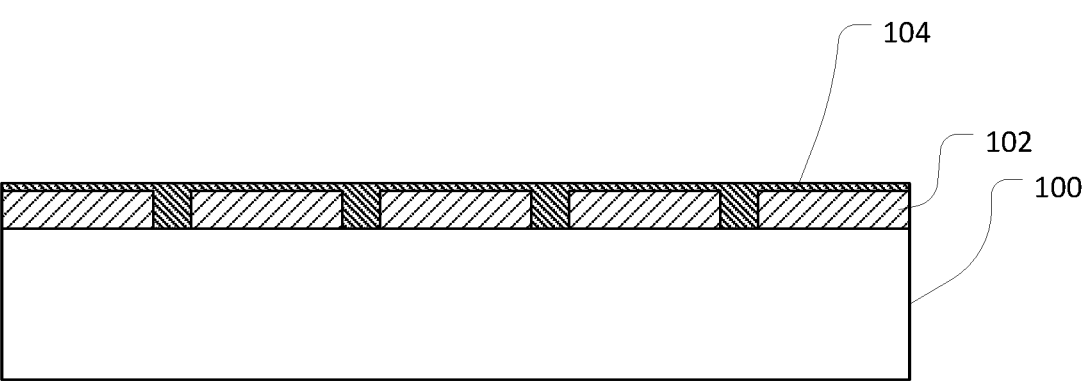
FIG. 1a
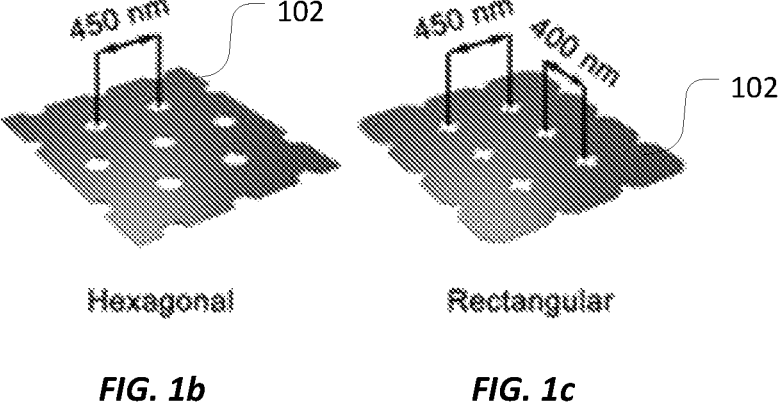
FIG. 1b                    FIG. 1c a Histo-sample (4 µm)

microscope slide nanoslide b Ultra-thin sample (70 nm)

microscope slide

0° nanoslide

90°

Myelin sheath

H&E nanoslide

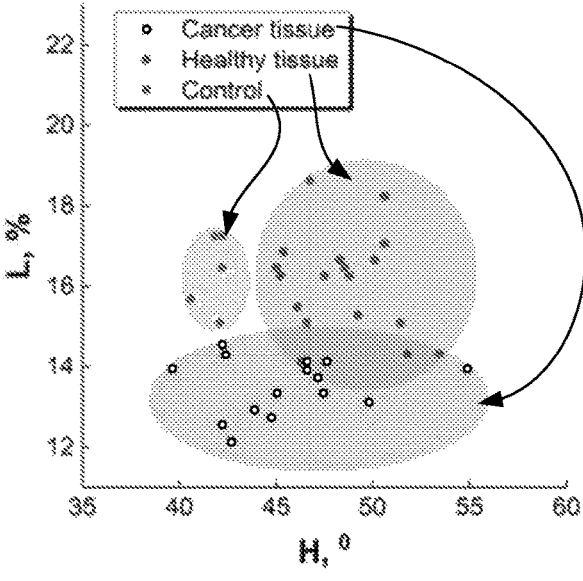
FIG. 16a
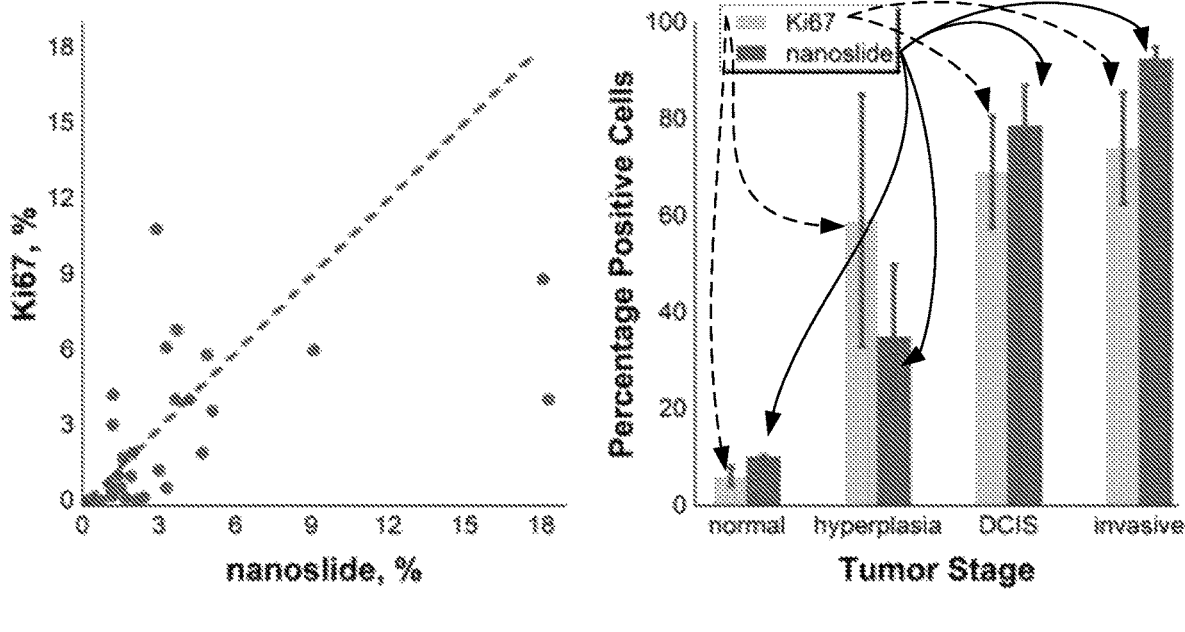
FIG. 16b                    FIG. 16c

Normal                    Hyperplasia                    DCIS

METHOD OF IDENTIFYING A STRUCTURE

FIELD OF THE DISCLOSURE

The present disclosure relates to the field of optical microscopy, histology and pathology. In one form the disclosure provides systems and methods of performing histology using an optical microscope and an enhanced sample holder.

BACKGROUND OF THE DISCLOSURE

PCT/AU2018/050496 in the name of La Trobe University (the entire contents of which are herein incorporated by reference) discloses systems and methods of optical microscopy which provide enhanced image contrast through use of a sample holder having a plasmonic layer including a periodic array of sub-micron structures. In the present disclosure reference to a nanoslide is reference to a sample holder in accordance with the teaching of PCT/AU2018/050496, or the Applicant's co-pending Australian patent application 2018904553, filed on 29 Nov. 2018, entitled "Microscopy method and system" and the International patent application claiming priority to AU2018904553 which was filed on the same day as present application, the contents of both being incorporated herein by reference for all purposes. Microscopy methods using such a sample holder are called histoplasmonics or colour contrast microscopy herein, which is abbreviated to CCM. The sample is placed on the sample holder adjacent the plasmonic layer. In use, the sample and sample holder are illuminated and an image of the sample is created. The inventors have observed that through interaction of the light with the sample and the plasmonic layer, a colour contrast is exhibited in the measured image. In particular, areas of the sample having different dielectric constant appear in the image with different colours. An increase in the intensity contrast is also achieved. In contrast to this, images obtained from conventional optical microscopy using a non-specific stain typically only exhibit an intensity contrast in a single colour which corresponds to the stain used. Even when a counter-stain or biomarker is used, these conventional techniques only provide images in distinct colours.

SUMMARY OF THE DISCLOSURE

In one aspect the present invention provides a method of identifying a structure in a sample comprising:
- providing a sample holder having an upper surface face and a lower surface, the upper surface having a plasmonic layer associated therewith, the plasmonic layer including a periodic array of sub-micron structures;
- applying the sample to the upper surface of the sample holder;
- illuminating the sample with light so that said light interacts with the sample and sample holder;
- forming an image using said light, after interaction with said sample and sample holder, wherein at least one localised structural property of the sample is visible in the image based on the colour of the received light; and
- identifying the structure from the image based at least partly on its colour.

Preferably the sample is a biological sample.

Preferably the localised structural property of the sample is a local dielectric constant or refractive index. In preferred embodiments in the image, structure in the sample with a given dielectric constant or refractive index appears in a corresponding colour range. In this way a structure that differs from neighbouring structures by its dielectric constant or refractive index will be rendered visually distinguishable from a neighbouring structure by the induced colour contrast.

In embodiments of all aspects disclosed herein the structure can be, without limitation, a cell, a cancer cell, part of a cancer cell, group of cancer cells, neoplastic cell, healthy cell, cell of a given type, indicator of cell state, parasite, group of cells, abnormal cell, infected cell, tissue of a given type.

The method can further employ any one or more of the following steps to enable identification of the structure, and or identification of a characteristic of the sample:
- Visualising the morphology of the structure
- Visualising the presence of the structure
- Visualising a region of the sample having an absence of a structure
- Visualising an absolute or relative size of a structure Moreover in some instances colour contrast can indicate the presence of the structure in the absence of other recognisable or characteristic features of the structure, e.g. in some cases morphology of a structure may be compromised, but colour contrast can be used to identify the structure from its apparent colour in the image.

Applicant's co-pending Australian patent application 2018904553, filed on 29 Nov. 2018, entitled "Microscopy method and system" and the International patent application claiming priority to AU2018904553 which was filed on the same day as the present application disclose further examples of sample holders and imaging methods that can be used to form images of a sample in embodiments of the present aspect of this invention and those disclosed in all other aspects disclosed herein. In this way a histologist's/pathologist's ability to draw a conclusion from a sample can be enhanced.

The method can include selecting a property of at least one of, the illumination or the sample holder to cause the selected localised structural property of the sample to be visible in the image in a predetermined colour or range of colours of received light. In one example a polarisation of the illumination can be selected.

In certain embodiments, any one or more of:
- the period and/or size and/or shape of the periodic array of sub-micron structures; and
- the thickness and/or material comprising the plasmonic layer;

can be chosen so that the light received from the sample and sample holder from a representative structure of interest appears in the image in a selected colour. For example, it has been shown by the inventors that for a sample holder having chosen plasmonic layer characteristics, representative cancer cells can be perceived by a user as being blue, in contrast with surrounding structures that are not blue. By using a sample holder with different plasmonic layer characteristics, the same cells may appear in a different colour.

Preferably the structure to be identified appears in a given colour. Most preferably the structure appears in an expected colour band to aid identification.

The sample can be thicker than a characteristic decay length of the plasmonic layer.

In some embodiments the sample is substantially transparent.

As noted herein the sample need not be stained or labelled, but in some embodiments staining or labelling, may be used in conjunction with the nanoslide.

In some embodiments the structure can be, a cell, a cancer cell, part of a cancer cell, group of cancer cells, neoplastic cell, healthy cell, cell of a given type, indicator of cell state, parasite, group of cells, abnormal cell, infected cell, tissue of a given type.

Preferably the structure to be identified is an indicator of cancer. In this case, the structure may be a cancer cell or group of cancer cells.

In another aspect there is provided a method of feature differentiation in a biological sample wherein the feature potentially has compromised or atypical morphology; the method including:

provided a sample holder having an upper surface face and a lower surface, the upper surface having a plasmonic layer associated therewith, the plasmonic layer including a periodic array of sub-micron structures;

applying the biological sample to the upper surface of the sample holder;

illuminating the sample with light so that said light interacts with the sample and sample holder;

forming an image using said light, after interaction with said sample and sample holder, wherein at least one localised structural property of the biological sample is visible in the image based on the colour of received light to thereby enable the feature to be differentiated from its surroundings based on its colour in the image.

The method can include verifying the feature based on morphology.

In some embodiments the methods described herein can include any one or more of the following processing steps or sub-steps:

colour filtering the image to selectively process a colour band of the received image;

determining a colour distribution or colour histogram of the received image;

performing a feature extraction method to identify one or more structures in the image;

processing the digital image with an image recognition system.

In a further aspect of the present invention there is provided a method that includes:

providing a sample holder having a plasmonic layer including a periodic array of sub-micron structures;

placing the sample on the sample holder adjacent the plasmonic layer without staining the sample;

illuminating the sample and sample holder and forming an image thereof to enable a structure in the sample to be visualised.

In the present specification "forming an image" includes forming a human perceptible image, e.g. by focusing light so that a user can perceive an image of the sample (or part thereof); or generating a digital or photographic image of the sample (or part thereof) for storage, transmission, display or other downstream process.

In another aspect there is provided a method of identifying a sign of cancer in a sample, comprising:

providing a sample holder having a plasmonic layer including a periodic array of sub-micron structures;

placing the sample on the sample holder adjacent the plasmonic layer;

illuminating the sample and sample holder and forming an image thereof to enable a structure in the sample to be visualised, wherein the image exhibits spatial colour contrast in the image of the sample depending on the localised dielectric constant of the sample;

identifying one or more features of the sample in the images at least partially based on the colour of the feature; and determining if one or more characteristics of the feature are a sign of cancer.

The method can include wherein the one or more features of the sample in the images that are characteristic of cancer are seen in the same colour, or a narrow colour band.

In a further aspect there is provided a method of determining a state of at least one cell in a sample, the method including: providing a sample holder having a plasmonic layer including a periodic array of sub-micron structures; placing the sample on the sample holder adjacent the plasmonic layer; illuminating the sample and sample holder and forming an image thereof to enable a structure in the sample to be visualised, wherein the image exhibits spatial colour contrast in the image of the sample depending on the localised dielectric constant of the sample; and determining a state of at least one cell based at least partially based on the colour of the at least one cell in the image.

The method can include determining a disease state of at least one cell.

In some embodiments the sample can contain a plurality of cells of the same type and the method can includes distinguishing at least one cell from cells of the same type based on a colour contrast between the at least one cell and cells in the plurality of cells. In some embodiments the sample can contain a plurality of cells of different types and the method can includes distinguishing at least one cell of one or more types within the plurality of cells based a colour contrast between the at least one cell and cells in the plurality of cells.

Preferably the method includes distinguishing at least one cell that is abnormal within the plurality of cells. In some cases the abnormal state can include cancer, benign abnormalities or infection. The method can include distinguishing at least one cell having a benign abnormal state within the plurality of cells. For example the method can provide a method of distinguishing normal breast tissue from a benign abnormality/state, such as hyperplasia, or Ductal carcinoma in situ (DCIS) within a population containing a plurality of breast epithelial cells.

In a further aspect there is provided a system for forming an image using an embodiment of any one of the aspects set out above. The system can include a microscope having an image forming system, an illumination system and a sample holder having an upper surface and a lower surface, the upper surface having a plasmonic layer associated therewith, the plasmonic layer including a periodic array of sub-micron structures. The system can include an image capture system to generate an image of the sample. It should be noted that the term upper surface and lower surface are not intended to reference a specific orientation of the sample holder either during sample preparation or use.

In some embodiments automated or partially automated methods of identifying a structure as disclosed herein can be performed in accordance with an embodiment of an aspect of the Applicant's co-pending Australian patent application 2018904551, filed on 29 Nov. 2018, entitled "Automated method of identifying a structure" and the International patent application claiming priority to AU2018904551 which was filed on the same day as the present application, the contents of both being incorporated herein by reference for all purposes.

BRIEF DESCRIPTION OF THE DRAWINGS

Illustrative embodiments of the present invention will be described by way of non-limiting example with reference to the accompanying drawings. The drawings filed with the present international application include colour images used in, and arising from use of embodiments of the present invention. The colour information forms part of the disclosure of the embodiments. Should black and white or grey-scale reproduction of the images occur, colour disclosure can be obtained from the originally filed documents. In the drawings:

FIG. 1a illustrates details of an exemplary sample holder used in embodiments of the present disclosure. The present invention should not be considered to be limited to use of sample holders with the particular microstructure arrays illustrated FIGS. 1b and 1c.

FIG. 16a shows the output of regions evaluated by an expert breast cancer pathologist plotted as a function of luminosity (L) versus hue (H).

FIG. 16b shows the percentage of cells positively identified as being cancerous on the basis of HSL colour space values.

FIG. 16c shows pathology scoring of Ki67 and nanoslide images for data collected from 24 mice, the percentage of cells identified as cancerous is indicative of the tumour stage.

DETAILED DESCRIPTION OF THE EMBODIMENTS

Figure 7:
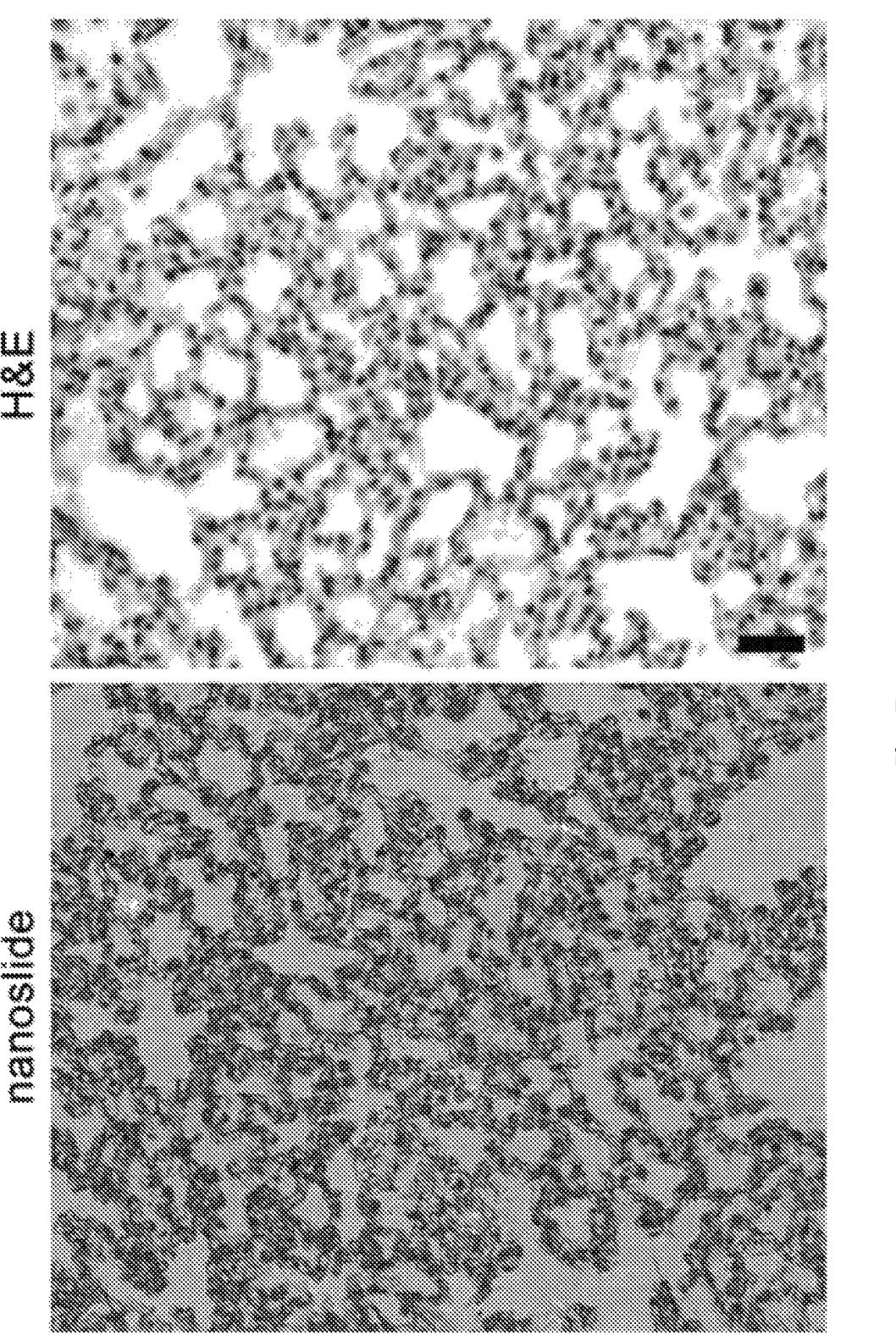
FIG. 7 shows two equivalent sections of healthy lung tissue. The top image is H&E stained, whereas the bottom is the corresponding nanoslide image. The scale bar is 5 μm.

The present inventors have further realised that the colour contrast exhibited when a nanoslide is used in optical microscopy may enhance the ability to perform histology and pathology. In particular embodiments, the use of a nanoslide enhances the ability to rapidly identify structures in the sample as structural differences are presented in contrasting colours, typically without needing to stain or label the sample. In other embodiments, use of a nanoslide may enhance the ability to see structures in a sample by selectively exhibiting colour contrast in a portion of a sample, the portion of the sample that selectively exhibits colour contrast is that portion (e.g. planar region) within a characteristic decay distance from the sample holder. In contrast conventional optical microscopy that uses stains or dyes to enhance or cause intensity contrast in a sample when it is illuminated uses the whole thickness of the sample to generate that intensity contrast. This has the disadvantage that the view of the sample (or image taken thereof) is in effect a two-dimensional projection of the total light absorption through the whole thickness of the sample. This can have the effect of obscuring detail in the sample in the image. In contrast, histology with a nanoslide only induces colour contrast in a portion of the sample nearest the sample holder and thus may usefully show structures with a size smaller than conventional microscopy relying on staining or labelling alone to generate an intensity contrast in the received light. See, for example, the pair of images shown in FIG. 7. As can be seen the nanoslide derived image has qualitatively sharper images, in addition to demonstrating colour contrast between locations in addition to intensity contrast.

FIG. 1a shows an embodiment of a sample holder used in an example of the present disclosure. FIG. 1a shows a cross section through a sample holder suitable for use in the present invention. The sample holder 100 includes a substrate, on which is deposited a plasmonic layer 102. FIGS. 1*b* and 1*c* show the two types of plasmonic layer 102 with sub-micron arrays that have been fabricated and may be used in an embodiment. The layers are each 150 nm thick silver films, although other suitable materials can be used. FIG. 1*b* has sub-micron arrays in the form of circular shaped nanoapertures with a 450 nm period arranged in a hexagonal pattern. FIG. 1*c* has cross-shaped nanoapertures on a rectangular pattern. The cross-shaped nanoapertures have a 450 nm period in one direction (defined here as the 0° direction) and a 400 nm period in the orthogonal direction (defined as the 90° direction). These arrays have a Surface Plasmon Polariton (SPP) resonance mode in the 470-550 nm range, (which is within the visible region of the electromagnetic spectrum). To protect the surface of the plasmonic layer 102, a layer 104 (10 nm±1 nm) of hydrogen silsesquioxane (HSQ), a glass-like material, is deposited after fabrication of the plasmonic layer 102. After capping with HSQ, the sample holder 100 has an upper surface similar to that of a conventional microscope slide on which a sample may be supported. In use, the HSQ layer also presents a polar surface which aids tissue adherence.

Samples to be imaged are prepared and placed on sample holders in accordance with an embodiment of PCT/AU2018/050496 in the name of La Trobe University. A sample 106, typically a slice of a biological tissue, which need not be stained or labelled in the preferred embodiment of the present invention, is placed on the sample holder adjacent the plasmonic layer, as shown in FIG. 2A.

Figure 3:
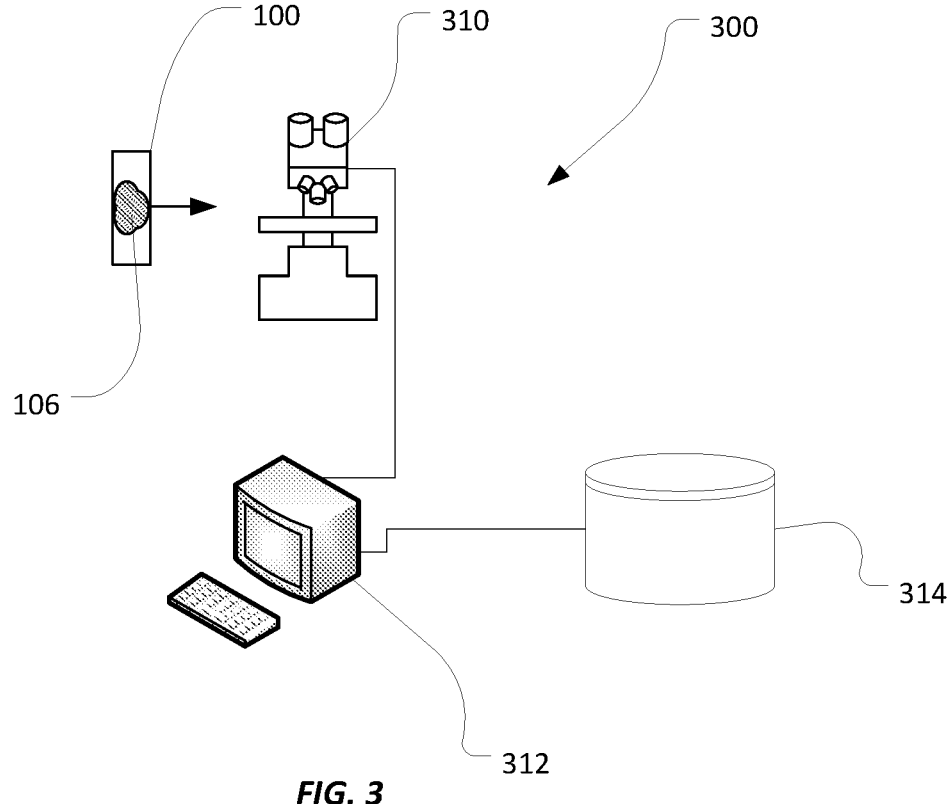
FIG. 3 is a schematic diagram of a system usable to perform an embodiment of the present invention.

FIG. 3 is a schematic representation of a system 300 configured to perform methods according to the present disclosure. In overview the system 100 includes a microscope 310 adapted to receive a sample holder 100. The microscope can capture images in transmission or reflection mode. The sample holder 100 is a nanoslide (a sample holder made in accordance with an aspect of PCT/AU2018/050496) having a plasmonic layer. The sample 106 that is to be imaged is positioned on the sample holder. In some embodiments the microscope is a conventional optical microscope with eyepieces for viewing by a user, however it can alternatively or additionally include an image capture system to generate a digital image for display, storage or other later use. In some embodiments the microscope 310 can form part of an automated slide scanner. The exemplary system 300 illustrated includes a user terminal 312 for display of captured digital images of the sample, and a data storage system for storing captured images.

Figure 2A:
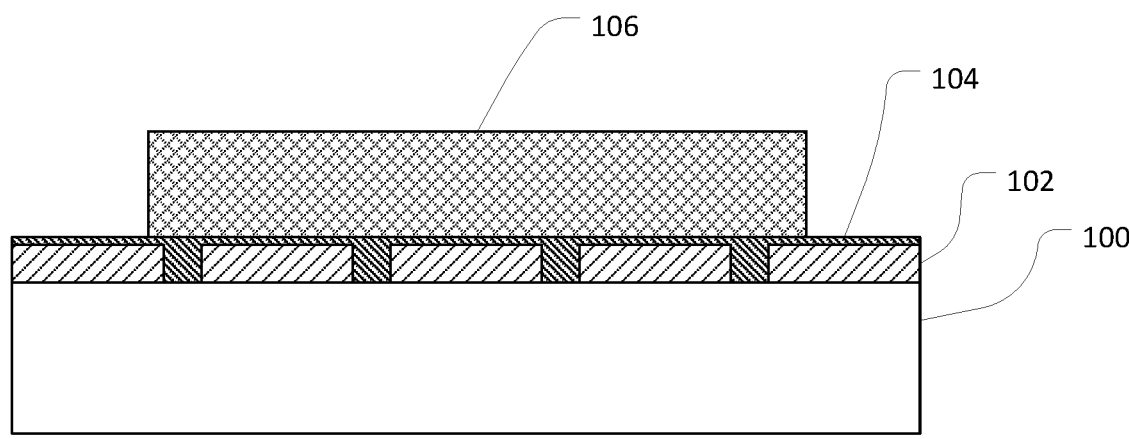
FIGS. 2a and 2b illustrates an example sample holder from FIG. 1a on which are positioned different samples for use in embodiments of the present invention.
Figure 2B:
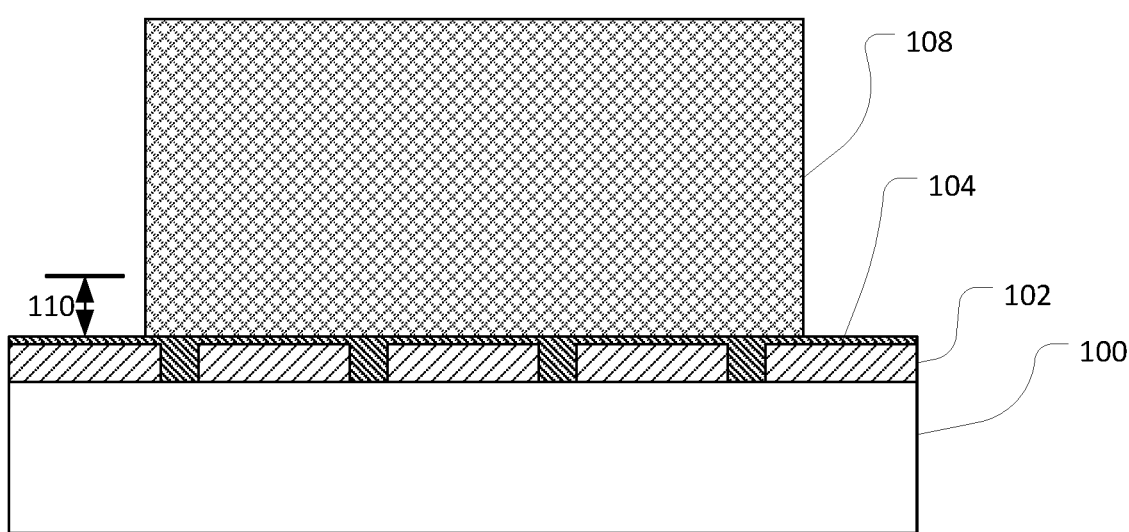
Figure 4:
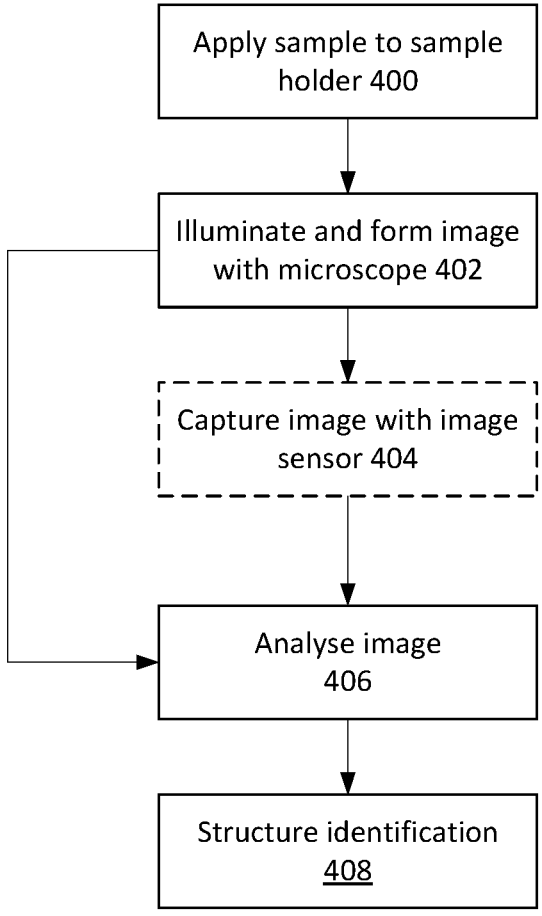
FIG. 4 is a flowchart illustrating steps in one method performed in an embodiment of the present invention.

FIG. 4 is a flowchart illustrating steps of one aspect of the present disclosure that can be used to identify a structure in a sample, such as the sample 106 of FIG. 2*a*, 2*b* or the like. The method begins at step 400 by applying the sample 106 to a nanoslide. The slide and sample holder are illuminated as set out herein at 402 and an image is formed. Optionally the image is captured in digital form in step 404. Following this, the image as perceived directly by a user or as captured in step 404, are analysed and one or more structural features in the sample are identified at 408. The analysis 406 and identification 408 steps can be performed either by a person or in an automated fashion as set out in the applicant's co-pending Australian patent application 2018904551, filed on 29 Nov. 2018, entitled "Automated method of identifying a structure" and the International patent application claiming priority to AU2018904551 which was filed on the same day as present application, The analysis step 406 is performed using at least the colour exhibited in the image. In the present invention, the colour at a particular location in the image is representative of a local physical property of the sample. In particular, by using a sample holder having a plasmonic layer including a periodic array of sub-micron structures a colour contrast is exhibited which encodes the localised dielectric constant in the sample. The analysis is performed to identify features in the image that are representative of one or more structures of interest in the sample. A structure of interest can, for example include, a cell, group of cells, part of a cell, interstitial space between cells, void in a cell, the morphology of any of the above. Most preferably the features of interest and/or structures are indicative of the health of the sample.

The underlying mechanism for the extraordinary optical contrast in the images is the resonant interaction of light with the collective oscillations of free electrons at a metal surface in the plasmonic layer of the sample holder, known as Surface Plasmon Polaritons (SPPs). The spectral change in transmitted light through an array of sub-wavelength apertures in contact with a dielectric specimen is a function of the wavelength shift, $\Delta\lambda$ of the SPP resonant modes $\lambda\theta_{SPP}$, where superscript B denotes the incident polarisation angle (the symbol is removed for unpolarised light) and the subscript indicates whether the dielectric constant is for the sample (d=s) or for air (d=a). The SPP modes are characterised by peaks in the transmission spectra, the corresponding wavelength shift relative to air when a sample of thickness t is placed on top of the nanoapertures is given by:

$$\Delta\lambda \approx (\lambda^{\theta}_{SPP,s} - \lambda\theta_{SPP,a})(1-\exp(-2t/l_d)), \tag{1}$$

where $l_d \sim \lambda/2\sqrt{\varepsilon_d}$ is the characteristic decay length of the SPP electromagnetic field, which is itself a function of $\varepsilon_d$, the dielectric constant of the sample. It should be noted however that in the preferred embodiments the sample is significantly thicker than the characteristic decay length of the sample. This is illustrated in the example of FIG. 2*b*. In this example the characteristic decay length $l_d$ is indicated by reference number 110. As can be seen the sample 108 on the sample holder 100 is thicker than the decal length 110. As the film thickness increases, the transmission SPP resonance peak is increasingly red-shifted until it equals $\lambda\theta_{SPP}$, after which no more colour change occurs. It follows that, when using a standard transmission bright-field microscope, a spatially resolved distribution of colours will result that relates directly to changes in the local dielectric constant in the sample. With the local dielectric constant encoded in the optical spectrum, a remarkable chromatic contrast effect is produced. This means that any structure within optically transparent samples, which previously was difficult to detect due to a lack of contrast, is detectable in the visible-light image, by virtue of the colour contrast captured in the images. Moreover, and in contrast to conventional optical microscopy that uses stains or dyes to induce or enhance intensity contrast in a sample when it is illuminated, or in preferred embodiments only generate discernible colour contrast on a narrow layer within the sample—less than the characteristic decal length of the plasmonic layer. Conventional microscopy shows intensity contrast throughout the whole thickness of the sample. This has the disadvantage (in conventional microscopy) that the image of the sample is in effect a two-dimensional projection of the total light absorption through the whole thickness of the sample (which may be significantly thicker than 200 nm—see for example the sample of FIG. 6 which is 4 µm thick. This can have the effect of obscuring detail in the sample for the viewer. Visually this can smear or blur the structure visible in the image. In contrast, histology with a nanoslide only induces colour contrast in a portion of the sample nearest the sample holder and thus may usefully show structures with a size than conventional microscopy relying on staining or labelling alone. See for example FIG. 7. As will be appreciated in conventional optical microscopy, thinner slices can ameliorate this problem somewhat, but cause a concomitant disadvantage that thin slices may not show appreciable intensity contrast with a thin slice.

Figures 5A, 5B:
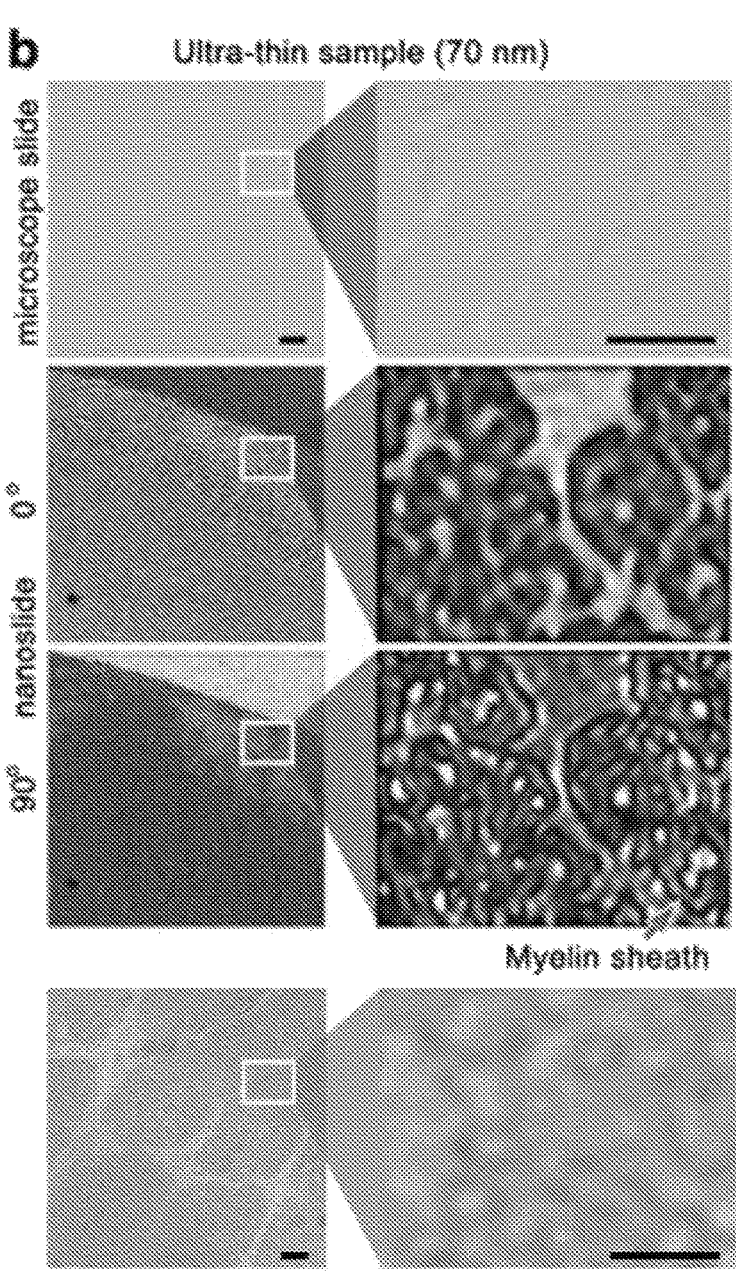
FIG. 5a illustrates images formed using an unstained sample on a conventional microscope slide (top) and an unstained sample on a nanoslide (bottom) in which colour contrast can be used to identify structures of the sample.
FIG. 5b illustrates images formed using an unstained sample on a conventional microscope slide (top); an unstained sample on a nanoslide using light of a first polarisation showing a first colour contrast image that can be used to identify structures of the sample (second); an unstained sample on a nanoslide using light of a second polarisation 90° to the first polarisation, showing a second colour contrast image that can be used to identify structures of the sample (third); and an equivalent sample that was subject to toluidine blue staining.
Figure 6:
FIG. 6 illustrates two pairs of images (arranged horizontally) formed using embodiments of the present invention illustrating an unstained sample on a conventional microscope slide (left) and an unstained sample on a nanoslide (right) in which colour contrast can be used to identify structures of the sample. A colour plot showing the transmission intensity (%) over the visible spectrum for selected spatial positions in the top series and bottom series of images.

FIGS. 5a, 5b and 6 illustrate several examples of images captured using embodiments of the present invention and which illustrate the ability to identify structures in the exemplary samples. The images are presented as they appear under the microscope with no staining or labelling.

For these histological samples, transgenic mice were produced by microinjection of a 4.7 Kb DNA fragment consisting of 1.3 Kb of MBP 58 sequences and 3.4 Kb of c-myc genomic DNA including part of intron 1, exons 2 to 3, and 316 bp of 38 untranslated sequences 19. The 2-50 pedigree carries approximately 10 copies of the construct on chromosome 9 and was isolated on the basis of a shivering phenotype evident in that pedigree alone, out of seven originally generated. The transgenic mice and nontransgenic littermates were perfused through the left ventricle with phosphate-buffered saline at 37° C. for 2 min, followed by 4% paraformaldehyde/2.5% glutaraldehyde in phosphate buffer, pH 7.4 containing 200 IU heparin/100 ml. For FIG. 5b, tissue was left in situ at 4° C. for 1 hr before sections were cut from the optic nerve via microtomy. Tissues were fixed in 10% buffered formalin, paraffin embedded and sectioned at 4 μm onto glass slides or nanoslides. In FIG. 5b the bottommost image pair shows an equivalent sample that was subject to toluidine blue staining. The scale bar is 5 μm.

For FIGS. 5a and 6 mammary glands were isolated from 50 day old BI/6 MMTV-PyMT positive female mice at a time when spontaneous mammary tumours develop. Tissues (including those derived from control BI/6 mice) were fixed in 10% buffered formalin, paraffin embedded and sectioned at 4 μm onto glass slides or nanoslides.

The nanoslides used include periodic arrays of nano-apertures fabricated using either focused ion beam (FIB) lithography technique (Helios NanoLab 600 Dual Beam FIB-SEM, FEI) or photolithography (for large areas). A hydrogen silsesquioxane (HSQ) protective layer was spun after the array fabrication. HSQ was converted into amorphous silicon oxide via exposure to electrons. In other embodiments a metal oxide capping layer e.g. $SiO_2$ can be used in place of HSQ. In the example of FIG. 5b the periodic array has the structure set out in connection with FIG. 1c, which has cross-shaped nanoapertures on a rectangular pattern. The cross-shaped nanoapertures have a 450 nm period in one direction (defined here as the 0° direction) and a 400 nm period in the orthogonal direction (defined as the 90° direction).

Bright-field and DIC data were collected using a Nikon Ti-U microscope system with a 60× (NA=0.7) objective; spectral data were collected using an IsoPlane SCT 320 (Princeton Instruments) at 1200 gratings/mm. The spectral data were normalized with respect to the bare substrate. All images presented here are 'as viewed' through the microscope without any image manipulation applied whatsoever. A Bruker Dimension Icon AFM was used to collect the topographical data and line scans.

Turning to FIG. 5a, which shows two bright-field optical images of unstained 4 μm section of breast tissue. The top image is an unstained section on a conventional glass slide. The bottom image is an equivalent section on a nanoslide. Imaging time was <1 second. As can be seen in the top image almost no structure can be seen, due to the sample being substantially transparent and thus the image displays a lack of contrast. As can be readily seen in the lower image, using the nanoslide, structures in the sample can be readily visualised due to the colour contrast exhibited in the image. The colours of different structures within the sample reflect areas of different dielectric constant. Moreover, structures of the same type also tend to appear in the same colour throughout the sample enabling reliable identification of such structures.

FIG. 5b shows images collected from optic nerve slices that are 70 nm thick. The scale bar is 5 μm. Such sections can typically only be viewed using transmission electron microscopy (TEM) and are essentially invisible using conventional optical microscopy, as can be seen in the top panel, which shows unstained samples. The second and third panels show an image (left) and close up detail thereof (right). The middle panels show the image captured with the sample being illuminated with 0° incident polarisation. The lower panels show the same sample but illuminated with light having a 90° incident polarisation. The bottommost panels show an equivalent sample that was subject to toluidine blue staining. As expected, little intensity contrast is observable.

It has been observed by the inventors that changing the incident polarisation direction (which had no effect on the conventional bright-field images) enabled subcellular structure of the tissue, such as the myelin sheath which is critical for a wide spectrum of pathologies, to be selectively enhanced. This is believed to be due to the different periodicity of the sub-micron arrays in a direction parallel to each of the polarisation angles. The different periodicity is believed to tune the transmission spectra so that the colour at which a structure of a given dielectric constant appears changes. This enables selective enhancement or colouring of structures with certain properties. It follows that that colour tuning of a typical target structure (e.g. cell type) can be performed by selecting the parameters of the sub-micron periodic structure, e.g. one or more of period, size, shape, array geometry, so that the target structure appears in a characteristic colour or colour band. As will be appreciated this can enhance rapid detection of a target structure or determination of its characteristics.

FIG. 6 illustrates two pairs of images (each pair arranged horizontally) the right image of each pair being formed using an embodiment of the present invention, and the left illustrating an unstained sample on a conventional microscope slide. The upper pair of images show healthy breast tissue. The lower images show cancerous breast tissue.

As can be seen in both sets of images certain structures of the sample tissue can be visualised and hence identified based on the colour differentiation from adjacent structures. Strikingly cancer cells in the lower pair of images show up as dark blue on the nanoslide. As can be appreciated the ability to identify target structures based on colour can greatly aid the process of histology. The inventors ascribe this sensitivity to the cancer cells having a different cell density, likely due to different amounts of protein, and therefore developing a slightly different dielectric constant. This colour contrast, usually with along with the change in their morphology can improve the ease with which (or likelihood of) correctly identifying the presence of cancer cells. See for example FIGS. 8 and 9.

A colour plot showing the transmission intensity (%) over the visible spectrum for selected spatial positions in the top series and bottom series of images is also provided. As indicated the background region, appears to be slightly blue to the viewer. The spectral content of this region is shown in the transmission intensity plot by the blue trace. Healthy structure appear to be either orange/yellow or green. The spectral trace being indicated at right by the orange and green traces respectively. Finally, the cancerous cells, only present in the bottom pair of images, appear to be dark blue. The spectral trace of these cells is indicated in purple to the right. The resultant perceptible colour of each spectra illustrated can be determined using a CIE plot, according to the CIE 1931 colour space.

As noted above a nanoslide can be used in a method of determining a state of at least one cell in a sample at least partially based on the colour of the at least one cell in the image. The method can include, determining a disease state of at least one cell. Advantageously the sample can contain a cells of the same type and the method can involve distinguishing certain cells (or their state) amongst cells of the same type based on a colour contrast between the at least one cell and cells in the plurality of cells. This can enable abnormal cells to be distinguishing. In some cases the abnormal state can include cancer, benign abnormalities or infection.

The inventors performed the following experiments that demonstrate that use of the nanoslide could enable determination of variations in cells in a tissue context and if benign and neoplastic tissues could be distinguished by label-free CCM. A particular focus of the experiment was to determine if a nanoslide could be used to achieve comparable levels of cancer cell detection to Ki67 for ductal carcinoma in situ (DCIS) which represents 20-25% of all breast cancer cases. Since it fits into existing pathology workflows nanoslide could be an ideal adjunct to H&E (haematoxylin and eosin) staining, improving specificity to cancer cells and potentially reducing rates of misdiagnosis whilst also reducing the tissue preparation time compared to IHC staining FIGS. 11a and 11b together illustrate, schematically the pathology workflow for small-animal, MMTV-PyMT mouse model study including, showing how serial sections were taken in order for a direct comparison of nanoslide, H&E, and Ki67.

Figure 11A:
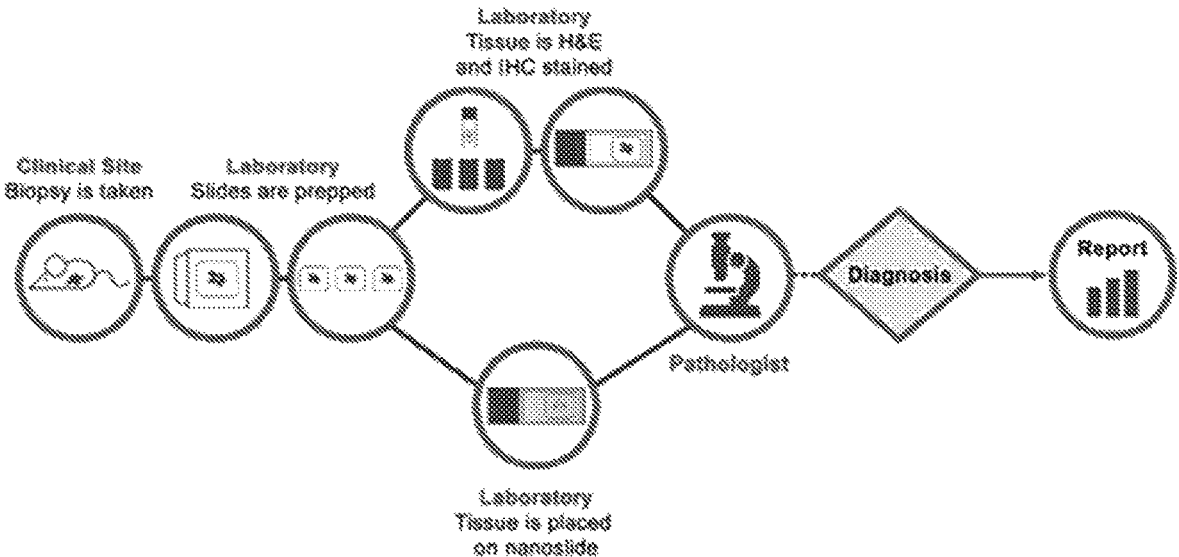
FIGS. 11a and 11b illustrate schematically the pathology workflow for small-animal, MMTV-PyMT mouse model study.
Figure 11B:
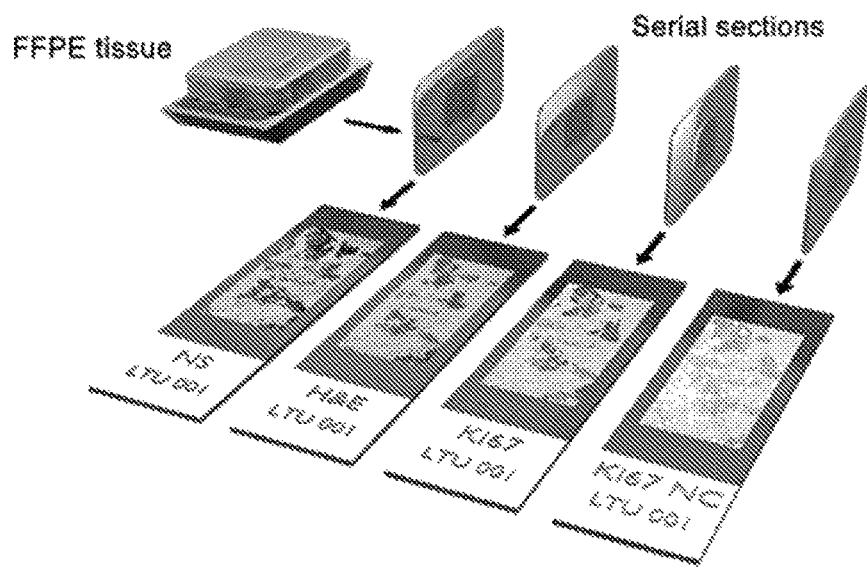

In the study the images made use of the MMTV-PyMT model of spontaneous breast tumorigenesis, where mice develop pre-invasive and invasive neoplasms within 50 days of age. Pre-invasive and invasive neoplasms have previously been shown to be distinguishable from benign epithelial cells using IHC staining for the proliferative marker Ki67. In total 24 mice were used for this study. The workflow for the study design is shown in FIGS. 11a and 11b. For each slice of tissue sectioned and placed on a nanoslide the neighbouring section was H&E stained (for use as the ground truth analysis by expert human analysis) whilst the next two sections were treated with IHC staining (one section with the proliferative marker and the other with control IgG.

Figure 12:
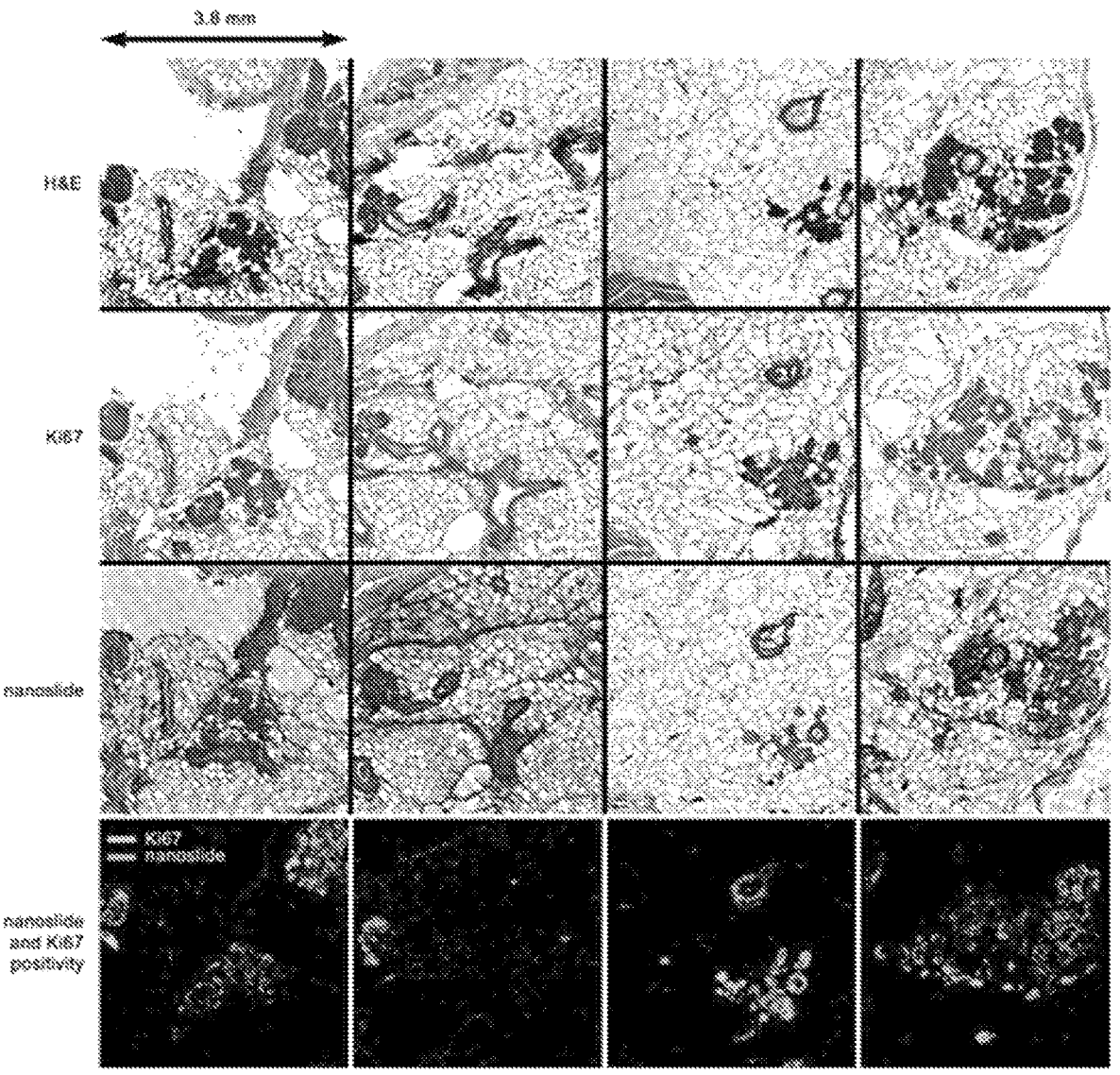
FIG. 12 shows large field-of-view (3.8 mm) sections of corresponding slices of H&E, Ki67, and nanoslide images (top to bottom), with the bottom row showing portions of the images identified to be positive for neoplastic cells. Regions with HSL values consistent with neoplastic MMTV-PyMT breast cancer cells are shown in light blue (nanoslide) and bright green (Ki67).

FIG. 12 shows large field-of-view (3.8 mm) sections of corresponding slices of H&E, Ki67, and nanoslide images (top to bottom); each slice is 4 μm thick ($\gg I_d$ for the nanoslide). These sections cover a range of different tissues types (e.g. lymph nodes, collagen, muscle tissue, ligament etc.) and also include regions of pre-invasive and neoplastic breast tissue. Using the ground truth pathology assessment and the comparative Ki67 IHC staining the HSL values associated with cancer cells were identified for nanoslide (see below). Similar approaches have previously been applied to segmentation of IHC stained images. Based on the range of HSL values for cancerous tissue using both Ki67 and nanoslide, by exploiting the intrinsic properties of the HSL colour space we were able to threshold the images to only display neoplastic tissue. The results of carrying out this procedure for nanoslide and Ki67 are shown on the bottom row of FIG. 12. Note that in the overlayed, large field-of-view positivity results there is excellent general correspondence between Ki67 and nanoslide (the two slices are separated by 12 μm in the tissue biopsy). This high degree of correlation between Ki67 and nanoslide was observed across all of the slides used in this study.

To quantify the performance and correlation between nanoslide and the IHC staining high-resolution imaging data was collected from the slides. A total of 64 regions were examined across the cohort of 24 mice. Following established protocols tissue was classified as True Positive (TP), True Negative (TN), False Positive (FP), and False Negative (FN)—see Methods. Two key pieces of information were used for tissue classification. The first was the pathology annotations, when a cancer containing region has been identified, high-resolution H&E stained slides were used to identify the stage of the cancer and the margins. A morphological assessment of the tissues was conducted by an expert human breast and murine mammary gland pathologist (O'Toole) and breast cancer researcher (Parker) and formed the 'ground truth' for the analysis presented in FIG. 13. Classification was applied according to the following descriptions.

| Classification | Description of classification method for Ki67 and Nanoslide |
| --- | --- |
| True Positive (TP) | TP was assigned when the HSL colour space values were consistent with cancer cells established by 'training' the segmentation algorithm. This 'training' was conducted based on the identification and correlation of cancerous tissue in Ki67 and nanoslide images by the expert pathologist with reference to the H&E slides (e.g. Shi et al, Scientific Reports, 2016). To be classified as TP also required that the identified region was within the area manually identified as containing cancer cells by the expert pathologists. |
| True Negative (TN) | TN was assigned when the HSL colour space values were consistent with one of the sub-types of non-cancerous tissues (e.g. adipose tissue, collagen, lymph nodes, blood vessels etc.). To be classified as TN also required that the identified region was outside of the area manually identified as containing cancerous tissue by the expert pathologists. |
| False Positive (FP) | FP was assigned when the HSL colour space values were consistent with cancer cells but the identified region was outside of the area manually identified as containing cancer cells by the expert pathologists. |
| False Negative (FN) | FN was assigned when the HSL colour space values were not consistent with either cancer cells or with non-cancerous tissue and when the identified region was within the area manually identified as containing cancer cells by the expert pathologists. |

Figure 13:
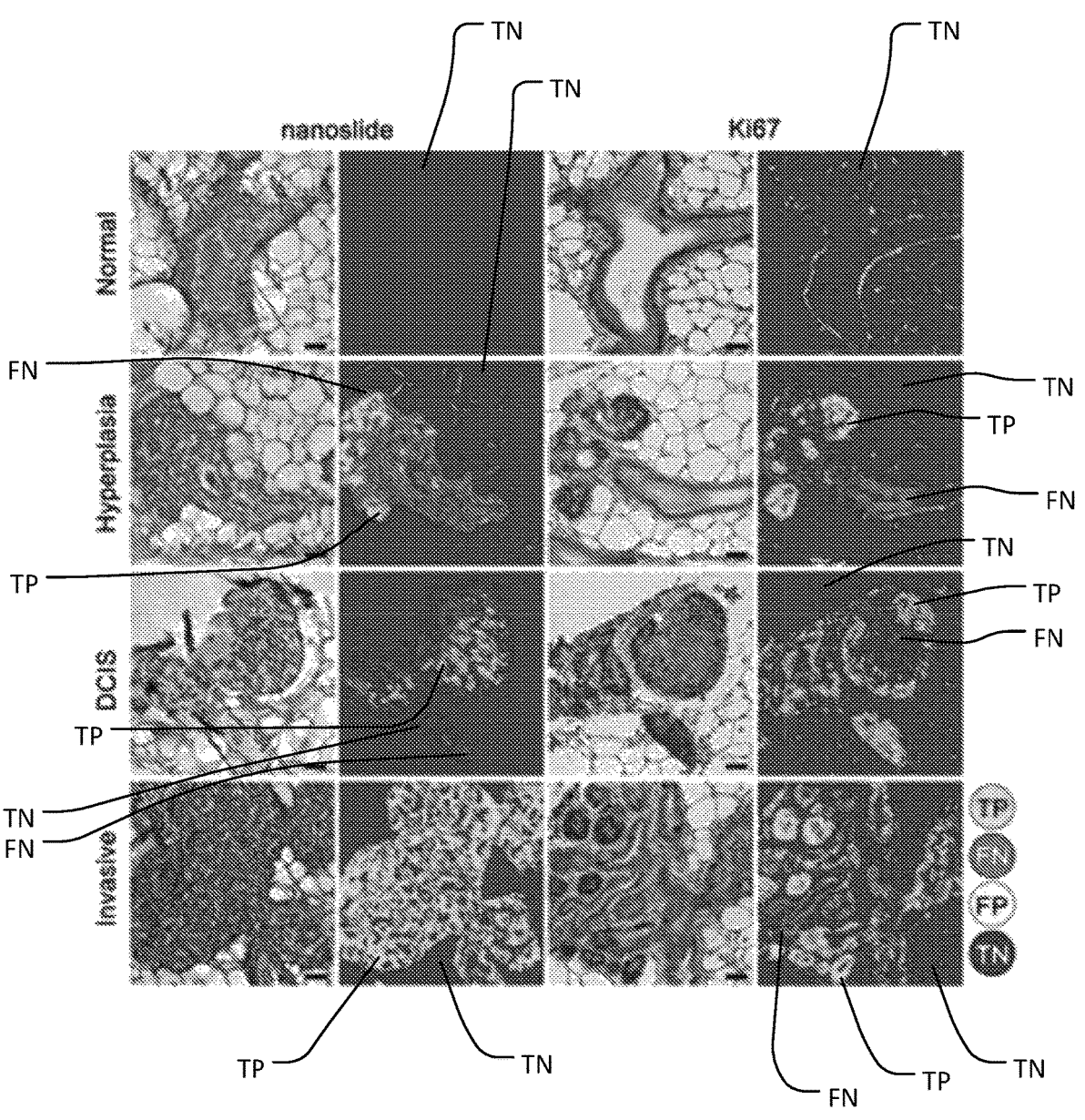
FIG. 13 shows an example output indicating the identification of a structure the identification of small-animal data based on HSL colour space and assessment by a breast-cancer pathologist.

The second piece of information came from the image pixel HSL colour space values which were compared against the reference values from the training data. Regions containing normal, hyperplasia, DCIS (ductal carcinoma in situ), and invasive neoplastic breast tissue were independently analysed for both nanoslide and Ki67 staining. Some example images of each type of region and resulting tissue classification are shown in FIG. 13. The images (1st and 3rd columns) are presented as they appear under the microscope. Confirming the results of the large field-of-view positivity analysis (FIG. 12, bottom row), neoplastic cells in pre-invasive and invasive neoplastic tissues were easily distinguished from surrounding cells in the same tissue and benign tissues via a colorimetric differential interaction as a result of either staining (Ki67—brown colour) or as a result of variations in the local dielectric constant (nanoslide—blue/purple colour). As seen from FIGS. 12 and 13, adipose and other types of non-cancerous tissue observed across the slides have a characteristically different colour (HSL) on both the nanoslide and Ki67, supporting this association. As can be seen in FIG. 13 the normal cells on the nanoslide appear to be almost uniformly categorised as TN. The invasive cells image on the nanoslide image was categorised as a large majority of TP regions surrounded by TN areas, showing accurate categorisation by the automated image analysis. The DCIS and Hyperplasia images include a region of majority TP towards the centre of the neoplastic regions surrounded by areas of mixed FN, TP, TN regions.

For both the nanoslide images and Ki67 images the mean RGB space and HSL space values for the cancer cells were determined from the ground truth standard. Cancer cells when imaged on the nanoslide manifest themselves as generally blue in hue, whereas, Ki-67 positive nuclei manifest themselves as brown hue in images of breast tissues.

The mean RGB and HSL channel values for positive cancer cells in Ki67 and nanoslide are summarised in Table 1. The RGB values for Ki67 positivity determined by the inventors are close to the published values from (Shi et al., Scientific Reports, 2016).

TABLE 1

| | Values | | | | | |
| | Mean RGB space values | | | Mean HSL space values | | |
| | R | G | B | H | S | L |
| Ki67 (brown) | 123 | 51 | 7 | 23 | 89 | 26 |
| Nanoslide (blue) | 23 | 69 | 86 | 196 | 58 | 21 |

Based on the variability of the colour change associated with cell positivity in nanoslide and Ki67 a ±15% threshold centred around the mean HSL colour space values, (for each of H, S, and L) was used for segmentation of positive cancer cells—that is, within this range cells were considered to be 'positive' for cancer. An example range of HSL colour space values corresponding to cancer positivity using nanoslide is shown in FIG. 14.

To further validate the results against published standards the inventors used an established scoring matrix for discriminating 'normal', hyperplasia, DCIS and invasive lesions. As revealed in results presented in FIG. 15, both approaches (nanoslide and Ki67) identify a similar percentage of neoplastic cells in a randomised preclinical study. For DCIS using H&E alone there is a low rate of concordance among pathologists. DCIS comprises lesions which are heterogeneous with highly variable morphology. Whereas at the extremes of normal and invasive, breast cancer is easy to discern, DCIS is subtle and consequently suffers from misdiagnosis based on H&E alone particularly at large fields-of-view.

Across the small animal models studied the measured values (HSL) corresponding to cancer cells in Ki67 and nanoslide are almost entirely confined to the cancer specific regions (or those that are pre-cancer lesions in this model—hyperplasia). In other types of tissue the colour is sufficiently different that these other tissues could not be mistaken for cancers by either a pathologist or by automated image analysis.

Figures 14, 15:
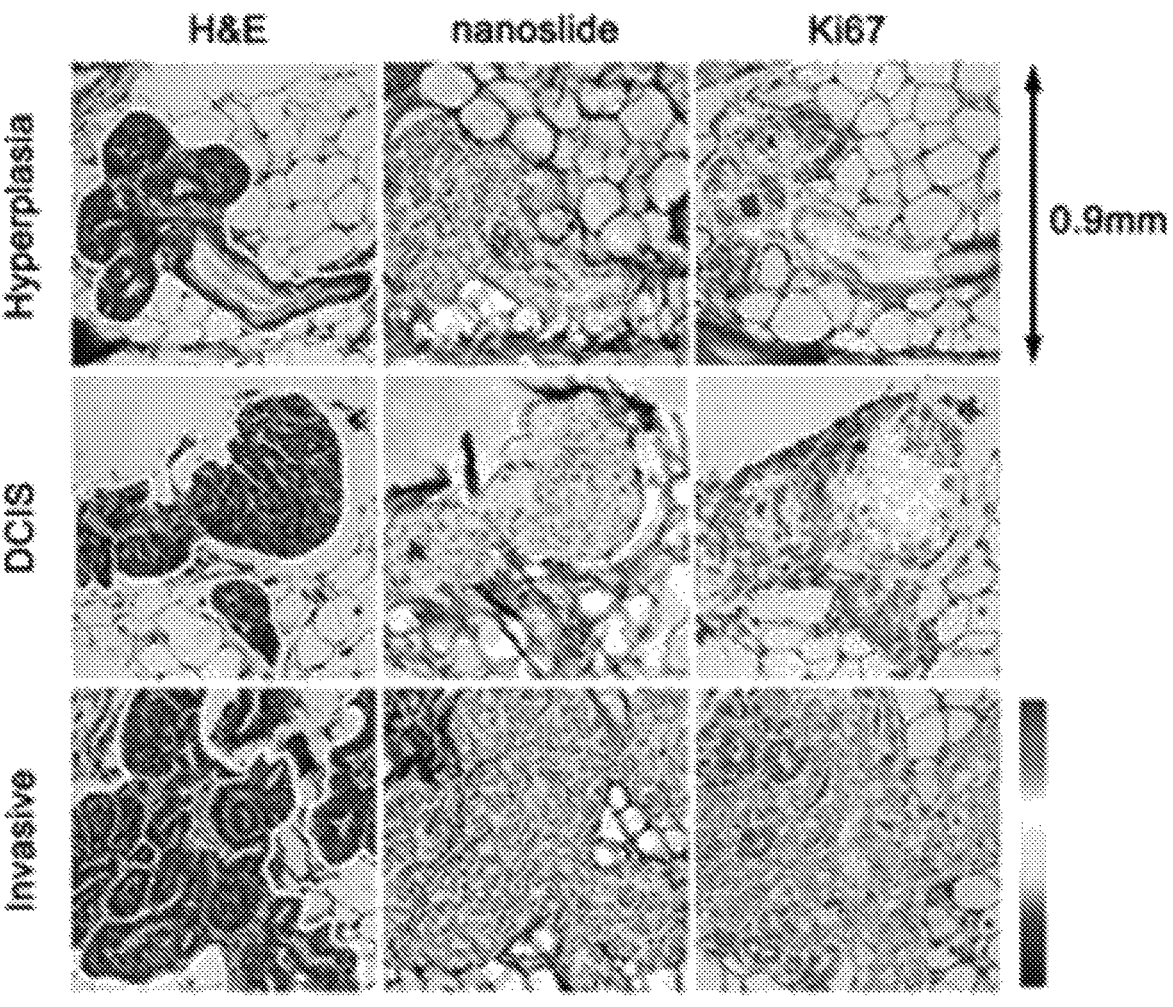
FIG. 14 illustrates an example range of HSL colour space values corresponding to cancer positivity in PyMT models using a nanoslide.
FIG. 15 illustrates H&E images for neoplastic regions—identified by the yellow outline (1st column)—and relative intensities of nanoslide and Ki67 positivity.

FIG. 15 illustrates the absolute difference between the image pixel HSL colour space values and the mean values for positive cells. $\chi$ is a metric used to define the similarity of the image pixel HSL colour space to the selected reference HSL colour space based on the median values predetermined for cancer cells. (See table 1 for mean HSL values).

$$\chi = \sqrt{(H-H_M)^2 + (S-S_M) + (L-L_M)^2}$$

H, S and L are pixel values in the HSL colour space and $H_M$, $S_M$, $L_M$, are mean values from table 1. Note, however, that this does not necessarily reflect the contrast perceived by the human eye when examining these samples under the microscope.

The methods disclosed herein utilise the differences in the spectral output between structures to identify those structures. FIG. 6, illustrates the received colour spectrum of benign and neoplastic breast tissue which giving rise to colour contrast in nanoslide images. On the basis of the 24 MMTV-PyMT mice studies the spectral output of cancer cells appears to be distinct from other types of non-cancerous tissue providing a novel mechanism for performing digital pathology. To further validate the results against published standards the inventors used an established scoring matrix for discriminating 'normal', hyperplasia, DCIS and invasive lesions. As revealed in results presented in FIG. 16a (which relate to the sample of FIG. 6), both approaches (nanoslide and Ki67) identify a similar percentage of neoplastic cells in a randomised preclinical study. DCIS comprises lesions which are heterogeneous with highly variable morphology; whereas at the extremes of normal and invasive, breast cancer is easy to discern, DCIS is subtle and consequently suffers from misdiagnosis based on H&E alone particularly at large fields-of-view.

FIG. 16a shows how the automated method described herein using a nanoslide sample holder discriminates between structures in a sample. In this case it has been shown that 'healthy' and invasive cancer tissue can be identified based in the hue (H,°) and luminosity (L, %) of the images. Note that the 'healthy' tissue sections are taken from MMTV-PyMT mice, 90% of which will eventually develop pre-invasive and invasive neoplasms, hence a small amount of overlap may be expected when comparing to invasive cancer regions. The difference between normal and cancer mammary tissue is further validated by the clear discrimination between normal/benign tissue in wild-type animals and neoplastic tissue.

Figure 16D:
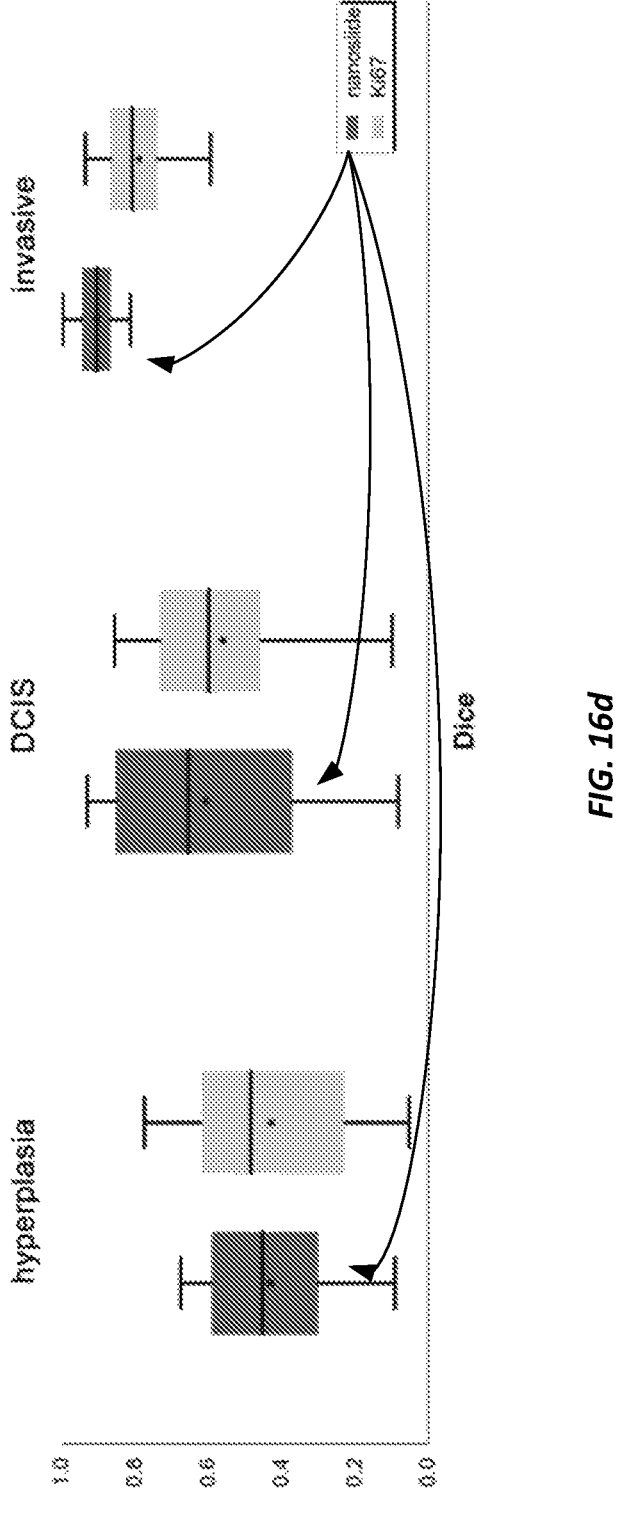
FIG. 16d shows the agreement of Dice coefficients for nanoslide and Ki67 for three different classes of neoplastic region.

To test the concordance of Ki67 and nanoslide we compared the percentage (by area) of tissue identified by the two pathologists as containing neoplastic cells according to the image pixel HSL colour space values; the results are summarised in FIG. 16b. For the regions examined (N=30) nanoslide and Ki67 exhibit highly positively correlated performance metrics. The Pearson correlation coefficient, r, and corresponding p-value for the Ki67 and nanoslide results confirm a positive correlation: r(28)=0.62, p<0.001. Of the cancer bearing tissues examined none had both non-zero Ki67 positivity and zero nanoslide positivity and only two had non-zero nanoslide positivity but zero Ki67 positivity. FIG. 16c, shows pathology scoring of Ki67 and nanoslide images for data collected from 24 mice, the percentage of cells identified as cancerous is indicative of the tumour stage. The positive correlation between Ki67 and nanoslide supports the breast cancer pathologists' manual scoring (FIG. 16c) and concurs with FIG. 16d that shows the Sørensen-Dice coefficient (DSC) coefficients for nanoslide and Ki67 for three different classes of neoplastic region. The DSC is defined as:

$$DSC = 2TP/(2TP+FP+FN)$$

Calculated for both nanoslide and Ki67 (FIG. 16*d*) based on the analysis of 64 high-resolution (200× magnification) images from both Ki67 and nanoslide data.

Pathology Assessment

In the example to confirm the timing of spontaneous development of mammary gland tumours in the C57 Bl/6 MMTV-PyMT model, mammary glands of C57 Bl/6 MMTV-PyMT mice at different stages were taken and morphologically evaluated by H&E and Ki67 by an expert human breast and murine mammary gland pathologist (O'Toole) and breast cancer researcher (Parker). Nanoslide samples were randomized and independently scored and then compared post-analysis to the results of Ki67 and nanoslide. The benchmark for the pathology assessment was a trained pathologist analysing the H&E stained tissue sections at high-resolution and without any time constraints. As this was a control study the cancer stage for the mice was already known by the pathologist. In addition, the pathologist could refer back to the IHC staining to confirm that no neoplastic tissue regions were missed during the assessment. When looking at a tumour region or duct containing cancer at high resolution the pathologist counts the number of cancer cells.

Once this has been done for all samples the pathologist then compared the number of individual positive cells (as determined by a colour change—'brown' for Ki67 and 'green/blue' for nanoslide) using either Ki67 or nanoslide and divided this number by the total number of cancer cells identified from pathological assessment of the H&E images to arrive at the final figure for "percentage positive cells". This analysis was conducted on 24 cancer containing regions across the 24 mice used in this study. Based on the knowledge of the cancer stage the results could be classified into 4 stages: 'normal', 'hyperplasia', 'DCIS', and 'invasive'. The mean value of the percentage of positive cancer cells as determined by the pathologist was calculated within each category, it is this mean value, averaged between the two independent sets of scores, which is represented by the height of the bars in the bar chart. The range (e.g. minimum and maximum percentages) over the different samples used to generate the error bars shown in FIG. 10*d*. The scoring matrix for discriminating normal, DCIS, and invasive lesions is shown in the following table

|  | Normal | DCIS | Invasive |
|---|---|---|---|
| Appearance of lumen | Empty Lumen | Filled Lumen | No Lumen |
| Epithelial Ki67 positivity (95% confidence interval) | 0-28% | 44-66% | 48-96% |

Figure 17:
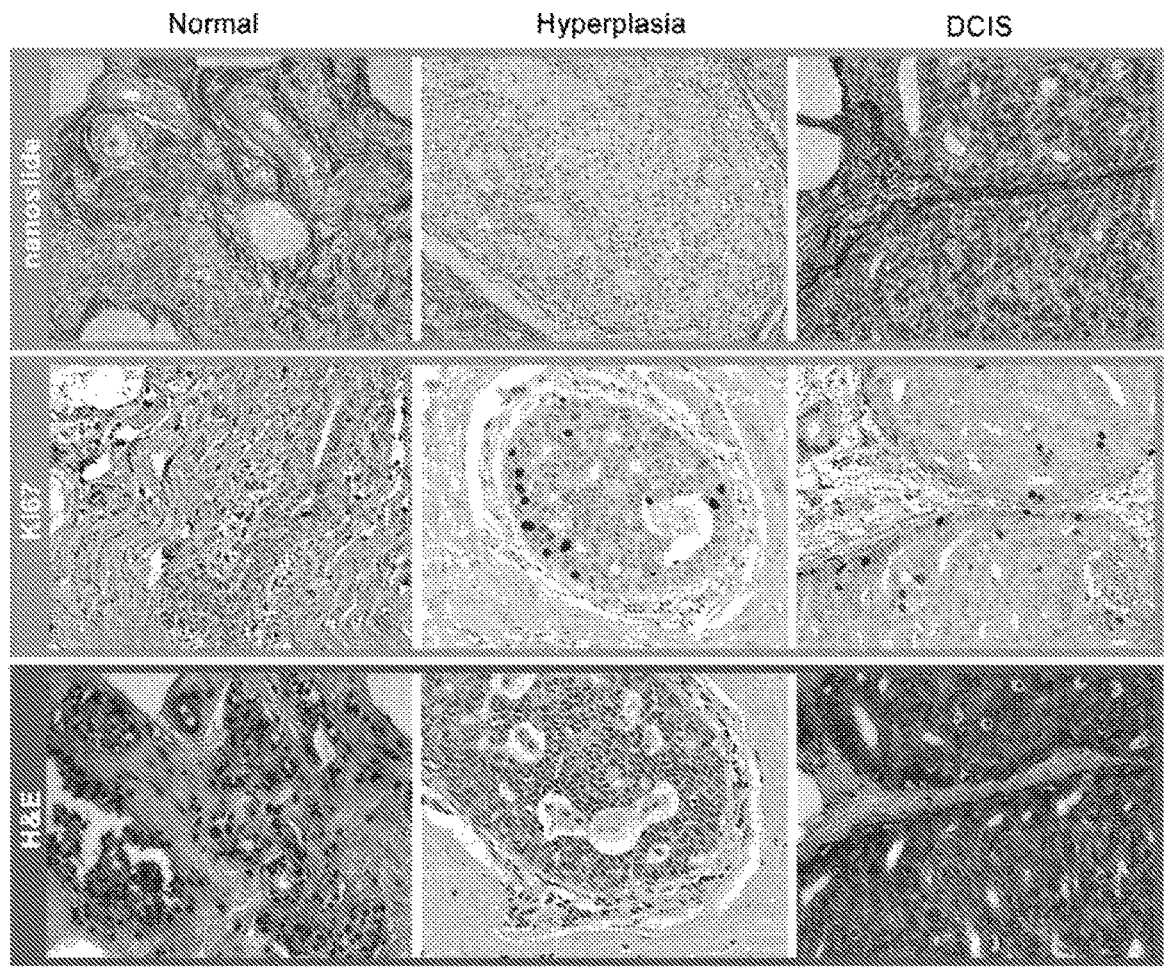
FIG. 17 shows an example implementation of an embodiment of the present invention used to detect a structure in human cells. In this case the structures are cancerous cells.

The methods disclosed herein can include distinguishing at least one cell having an abnormal state within the plurality of cells, including enabling a distinction to be seen between benign abnormal states and healthy states. For example the method can provide a method of distinguishing normal breast tissue from a benign abnormality/state, such as hyperplasia, within a population containing a plurality of breast epithelial cells. FIG. 17 shows an example implementation of an embodiment of the present invention used to detect a structure in human cells (top row), compared to corresponding images taken with IHC staining (middle row) and H&E staining (bottom row). Serial sections of normal reduction mammoplasty, hyperplasia or ductal carcinoma in situ human tissue were hematoxylin and eosin stained, IHC stained for proliferative marker Ki67 (both on glass slides) or placed on the nanoslide (stain-free). Light microscopy was used to visualise tissue morphology and colour. As discussed above brown colouring in the middle row indicates Ki67 positivity. Differential colour appearance of cells in the nanoslide images indicates the state of the cells, and in particular the presence of cancer cells appear blue/purple as noted above.

Figure 18A:
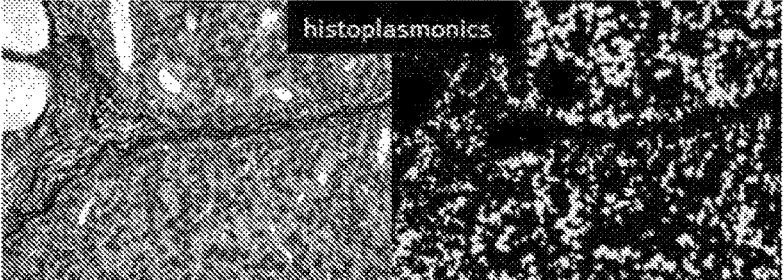
FIG. 18 shows examples of uses of a nanoslide to distinguish normal, benign and cancer pathologies in human breast epithelial cells.
Figure 18B:
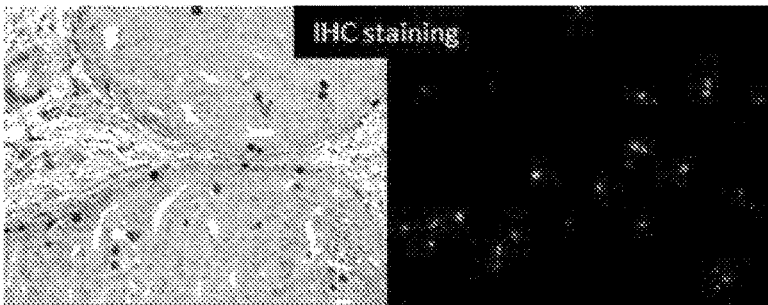

FIG. 18*a* shows the image illustrating DCIS in breast tissue imaged with CCM from FIG. 17, whereas 18*b* shows the image illustrating DCIS in breast tissue imaged with IHC staining from FIG. 17. In each image the right hand panel shows a segmented image that identifies portions of each captured image having a colour within 15% of the mean colour of cancer for the sample (see FIG. 14 for the CCM colour range, and table 1). As can be easily observed significant numbers of differentiated cells can be observed in the CCM image. This compares favourably in to IHC staining based on proliferative markers (FIG. 18*b*) which positively identifies few cancer cells.

As will be appreciated the identification of cancer and other disease may be based on subtle changes in cellular morphology such as alteration to the cell cytoskeleton and nucleus. This Includes cell symmetry, shape, nuclear pleomorphism/organisation. Distinguishing cell types may be based on cell size, shape and tissue organisation. Use of embodiments of the present invention may allow enhanced visibility of such characteristics and structures. Moreover, when morphology is decreased/compromised (due to tissue preservation/preparation techniques or when there are only very few cancer slides present that become difficult to find) it is very difficult to make accurate diagnoses of cancer based in morphology alone. In such situations embodiments of the present invention may still offer colour contrast as a distinguishing feature. That is colour contrast can still be visible when larger scale morphology is compromised. The examples presented herein indicate that the colour of cells may be different in cancer cells compared to non-cancerous cells.

Figure 8:
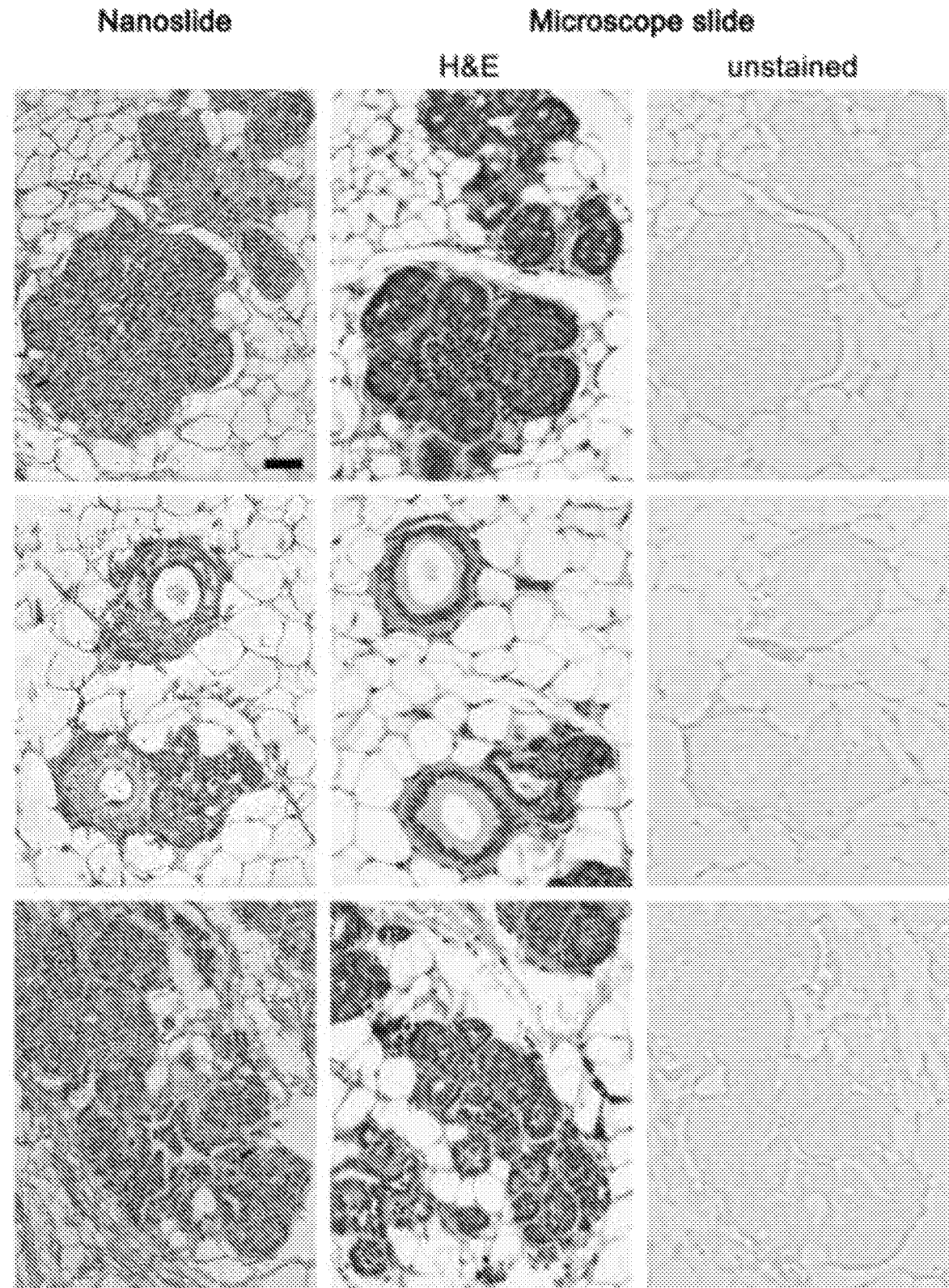
FIG. 8 illustrates images collected under identical conditions from breast cancer tissue illustrating the relative ease of detecting structures of interest when colour contrast is used.

FIG. 8 illustrates images collected under identical conditions from breast cancer tissue using the following techniques:

(Left column) A nanoslide in accordance with an embodiment of the present invention. These images were collected in a few seconds with no staining, labelling or image enhancement.

(Middle column) H&E staining—the most widely used current standard for tissue imaging.

(Right column) Brightfield microscopy of the same unstained sample.

After image collection analysis is performed to identify structures of interest (e.g. cancer cells). In the nanoslide images cancer cells could be instantly identified by the pathologist due to them appearing in a dark green/blue colour in the image, which made their morphology stand out clearly with respect to the background. The same analysis, however, using standard H&E approaches was much more challenging due to the uniform colour of the stain which makes a clear differentiation from the surrounding healthy cells difficult. Using a H&E stain may lead to a high rate of misdiagnosis for many early stage cancers due to the difficulty in differentiating cancer cells form healthy cells. In the images the scale bar is 5 μm. As expected, the unstained sample does not show any useful contrast.

Using conventional optical microscopy, it is difficult to determine if a cell is likely to be invasive or metastatic. Given that metastasis is responsible for patient mortality, diagnostics that may distinguish invasive cancers or those most likely to metastasise can offer something not currently available in pathology.

Figure 9:
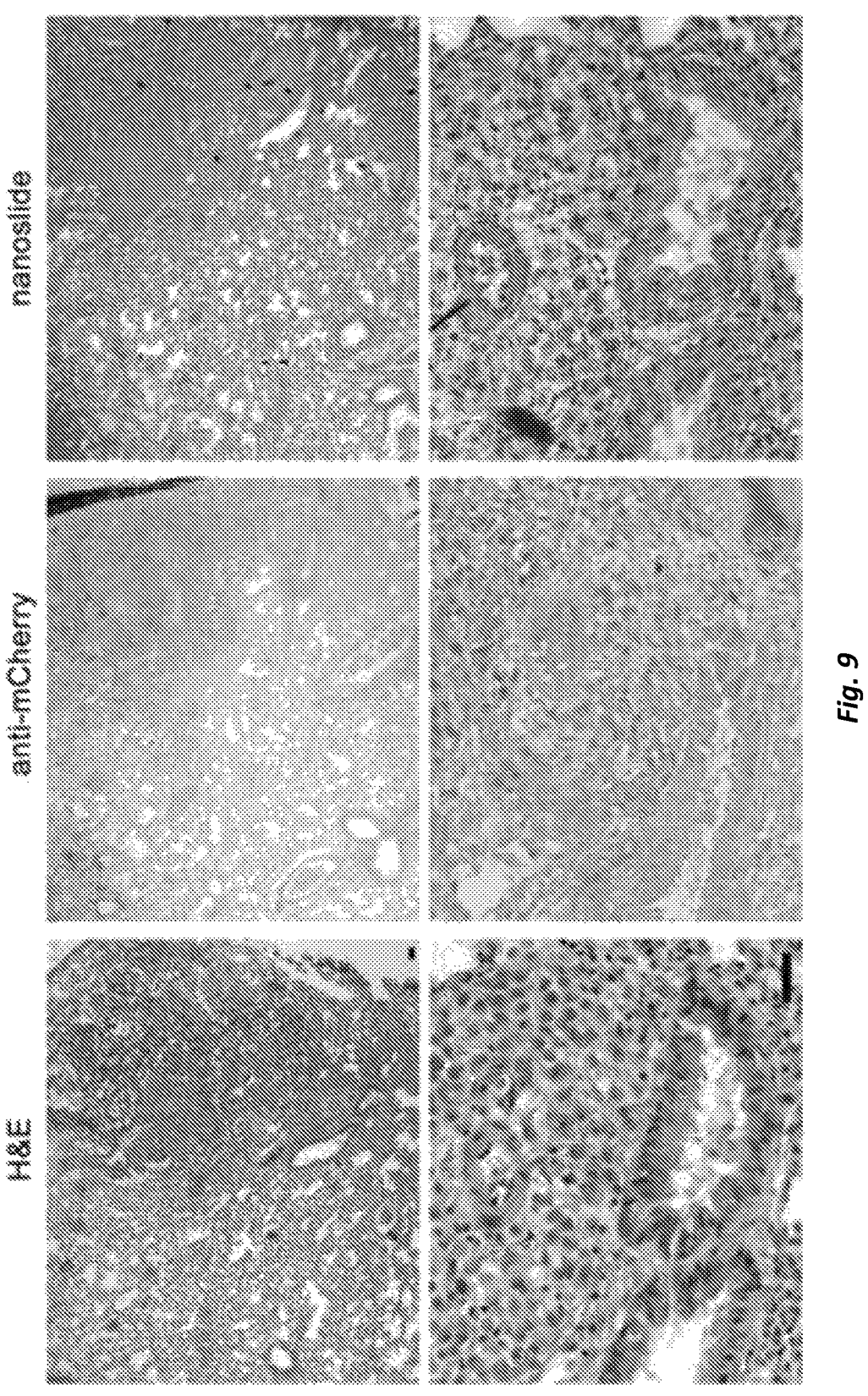
FIG. 9 illustrates a comparison of H&E staining, immunohistochemical detection, and imaging using a nanoslide for lung tissue with breast cancer metastasis.

FIG. 9 illustrates the relative ease of using an embodiment of the present invention for this purpose. As will be appreciated, cancer cells are not normally easily detected with H&E; however, they can be differentiated via immunohistochemical methods (which typically takes two days post sectioning) and via use of a nanoslide imaging technique as described herein (which takes a few seconds post sectioning).

Figure 10:
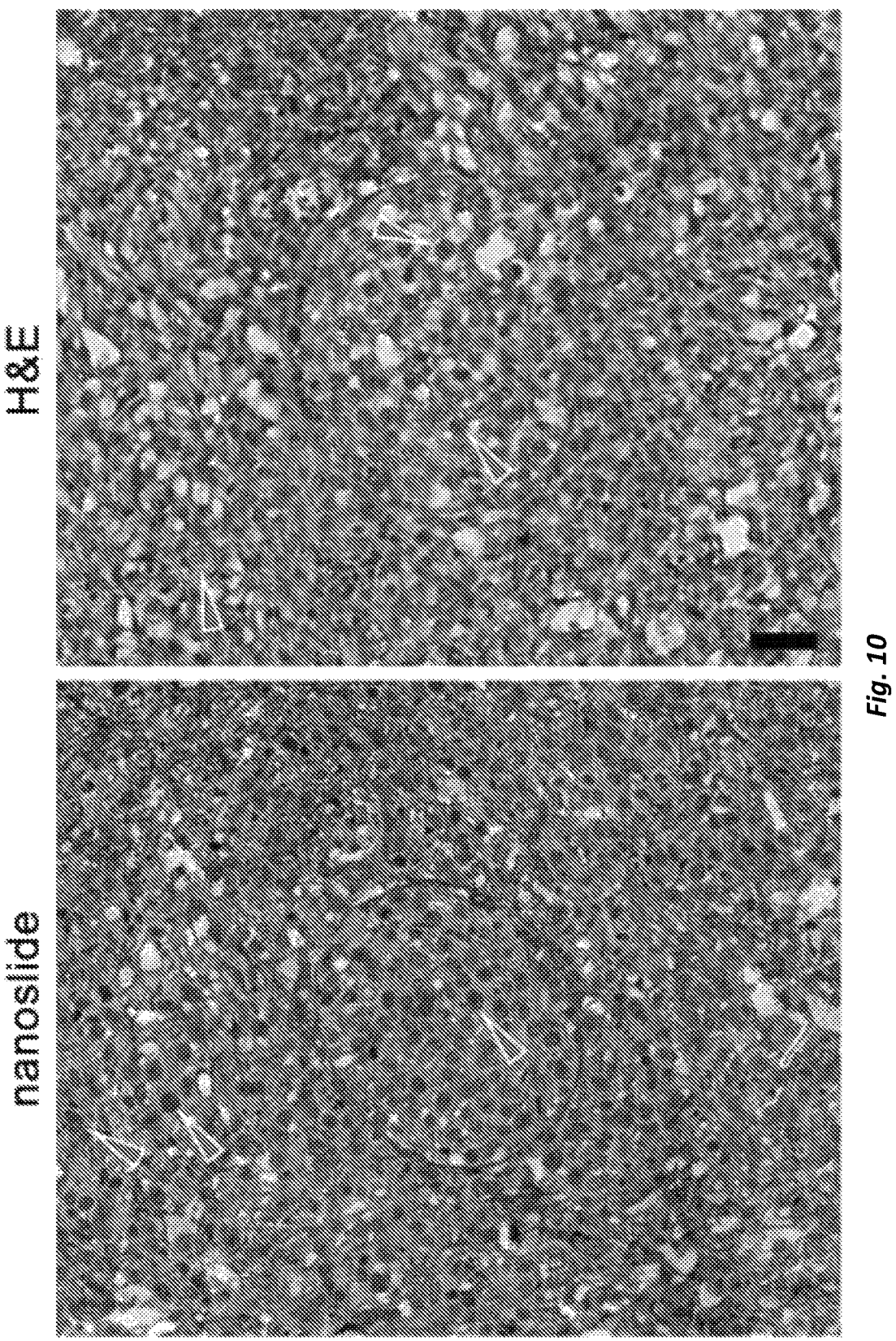
FIG. 10 shows a further comparison of H&E staining to methods using a nanoslide for detecting cancer cells in lung tissue sections with a breast cancer metastasis.

FIG. 9 shows three rows of two images. In each row the right image is at low magnification and the left shows a close up of a region including a cancer cell. The top row is a sample that is subject to H&E staining. The middle row is subject to anti-mCherry immunohistochemical detection. The bottom row is an unstained sample placed on a nanoslide. An enlarged region showing the cancer cells on a nanoslide is shown in FIG. 10. The scale bars are 5 μm. FIG. 10 shows further detail of H&E stained lung cancer tissue section (note that this is not normally used as a diagnostic test for this type of cancer). In the corresponding CCM image, the cancer cells (confirmed by a two-day immunohistochemical detection procedure) are indicated by the red arrows. Using a method as describes herein these could be readily identified by the pathologist, as a result of the colour contrast showing them in a deeper shade of brown to other cells.

The majority of breast cancers arise in the ductal epithelium. It can be difficult to distinguish different states in epithelial cells—including normal, hyperplasia (a benign abnormality) and the earliest stages of cancer. This is very important in accurate patient diagnosis, monitoring and treatment (including deciding on surgery). The data presented above illustrates that epithelial cancer cells can be distinguished by the blue/purple appearance on nanoslide. This appearance distinguishes cancer cells from other cells in the same tissue, but also distinguishes cancer versus benign or normal epithelial cells across different tissues. Together, this supports the ability for methods disclosed herein to enable the distinguishing (by human or computer implemented analysis) of different states of the same cell of origin (which may have relevance to various diseases including cancer and infection).

Moreover, some embodiments of the present invention do not require the histologist and pathologist to use any special equipment or training (in addition to what the slide preparation and pathological visualising and assessment already used). The nanoslide resembles a conventional microscope slide. Hence, CCM can integrate into existing pathology workflows (including using conventional microscopes for visualisation) but provide the pathologist with high contrast images. In particular, for cancer CCM provides 'IHCS-like' images without requiring any additional staining or preparation.

In a clinical setting a standard IHCS takes 4 hours; using CCM the results/images are obtained as soon as the sample goes under the microscope. Some pathologist will examine 200-300 samples per day. In 5-10% of hard-to-diagnose cases (including early-stage cancers) additional special stains are requested representing a significant disruption to workflow and cost in time waiting for a more definitive diagnosis.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of identifying a structure in a sample comprising:

providing a sample holder comprising a substrate and having an upper surface and a lower surface, the upper surface having a plasmonic layer associated therewith, the plasmonic layer supported by the substrate and including a periodic array of sub-micron structures;

applying the sample to the upper surface of the sample holder;

illuminating the sample with light so that said light interacts with the sample and the sample holder;

forming an image using said light, after interaction with said sample and said sample holder, wherein at least one localised structural property of the sample is visible in the image based on the colour of the received light; and identifying the structure from the image based at least partly on its colour;

wherein the sample is thicker than a characteristic decay length of the plasmonic layer, and/or the sample is substantially transparent.

2. The method of claim 1, wherein the localised structural property of the sample is a local dielectric constant or refractive index.

3. The method of claim 2 wherein, in the image, structure in the sample with a given dielectric constant or refractive index appears in a corresponding colour range.

4. The method as claimed in claim 1, including any one or more of the following to enable identification of the structure and or identification of a characteristic of the sample:

visualising the morphology of the structure;

visualising the presence of the structure;

visualising a region of the sample having an absence of a structure;

visualising an absolute or relative size of a structure.

5. The method as claimed in claim 1, including selecting a property of at least one of the illumination and the sample holder, so to cause the selected localised structural property of the sample to be visible in the image in a predetermined colour or range of colours of received light.

6. The method as claimed in claim 5, wherein one or more of the following properties are selected:

a polarisation of the illumination;

the period and/or size and/or shape of the periodic array of sub-micron structures;

the thickness and/or material comprising the plasmonic layer.

7. The method as claimed in claim 1, wherein the structure to be identified is an indicator of cancer, and/or the structure is a cancer cell, part of a cancer cell, a group of cancer cells, a neoplastic cell, a healthy cell, a cell of a given type, an indicator of cell state, a parasite, a group of cells, an abnormal cell, an infected cell, or tissue of a given type.

8. A method of feature differentiation in a biological sample wherein the feature potentially has compromised or atypical morphology; the method including:

providing a sample holder comprising a substrate and having an upper surface and a lower surface, the upper surface having a plasmonic layer associated therewith, the plasmonic layer supported by the substrate and including a periodic array of sub-micron structures;

applying the biological sample to the upper surface of the sample holder;

illuminating the sample with light so that said light interacts with the sample and the sample holder;

forming an image using said light, after interaction with said sample and said sample holder, wherein at least one localised structural property of the biological sample is visible in the image based on the colour of received light to thereby enable the feature to be differentiated from its surroundings based on its colour in the image;

wherein the sample is thicker than a characteristic decay length of the plasmonic layer, and/or the sample is substantially transparent.

9. The method as claimed in claim 1, further including any one or more of the following:

colour filtering the image to selectively process a colour band of the image;

determining a colour distribution or colour histogram of the image;

performing a feature extraction method to identify one or more structures in the image;

processing a digital image with an image recognition system.

10. A method of identifying a sign of cancer in a sample, comprising;

providing a sample holder comprising a substrate and having a plasmonic layer supported by the substrate including a periodic array of sub-micron structures;

placing the sample on the sample holder adjacent the plasmonic layer;

illuminating the sample and the sample holder and forming an image thereof to enable a structure in the sample to be visualised, wherein the image exhibits spatial colour contrast in the image of the sample depending on the localised dielectric constant of the sample;

identifying one or more features of the sample in the images at least partially based on the colour of the feature; and determining if one or more characteristics of the feature are a sign of cancer;

wherein the sample is thicker than a characteristic decay length of the plasmonic layer, and/or the sample is substantially transparent.

11. The method of claim 10, wherein the one or more features of the sample in the images that are characteristic of cancer are seen in the same colour, or in a narrow colour band.

12. A method of determining a state of at least one cell in a sample, the method including:

providing a sample holder comprising a substrate and having a plasmonic layer supported by the substrate including a periodic array of sub-micron structures;

placing the sample on the sample holder adjacent the plasmonic layer;

illuminating the sample and the sample holder and forming an image thereof to enable a structure in the sample to be visualised, wherein the image exhibits spatial colour contrast in the image of the sample depending on the localised dielectric constant of the sample; and determining a state of at least one cell based at least partially based on the colour of the at least one cell in the image;

wherein the sample contains a plurality of cells of the same type and the method includes distinguishing at least one cell from cells of the same type based on a colour contrast between the at least one cell and cells in the plurality of cells.

13. The method of claim 12, including determining a disease state of at least one cell.

14. The method of claim 12, wherein the sample contains a plurality of cells of different types and the method includes distinguishing at least one cell of one or more types within the plurality of cells based on a colour contrast between the at least one cell and cells in the plurality of cells.

15. The method of claim 12, further including distinguishing at least one cell that is abnormal within the plurality of cells, or at least one cell having a benign abnormal state within the plurality of cells.

16. A system adapted for use in the method of claim 1, the system including a microscope having an image forming system, an illumination system, and a sample holder having an upper surface and a lower surface, the upper surface having a plasmonic layer associated therewith, the plasmonic layer including a periodic array of sub-micron structures.

17. The method as claimed in claim 8, further including any one or more of the following:

colour filtering the image to selectively process a colour band of the image;

determining a colour distribution or colour histogram of the image;

performing a feature extraction method to identify one or more structures in the image;

processing a digital image with an image recognition system.

18. The method of claim 14, further including distinguishing at least one cell that is abnormal within the plurality of cells, or at least one cell having a benign abnormal state within the plurality of cells.

19. The method of claim 1, wherein the sample is thicker than the characteristic decay length of the plasmonic layer.

20. The method of claim 1, wherein the sample is substantially transparent.

21. The method of claim 1, wherein the sample is thicker than the characteristic decay length of the plasmonic layer and wherein the sample is substantially transparent.

22. A method of determining a state of at least one cell in a sample, the method including:

providing a sample holder comprising a substrate and having a plasmonic layer supported by the substrate including a periodic array of sub-micron structures;

placing the sample on the sample holder adjacent the plasmonic layer;

illuminating the sample and the sample holder and forming an image thereof to enable a structure in the sample to be visualised, wherein the image exhibits spatial colour contrast in the image of the sample depending on the localised dielectric constant of the sample; and determining a state of at least one cell based at least partially based on the colour of the at least one cell in the image;

wherein the sample is thicker than a characteristic decay length of the plasmonic layer, and/or the sample is substantially transparent.

* * * * *